US012190401B2

(12) United States Patent
Ikeda et al.

(10) Patent No.: US 12,190,401 B2
(45) Date of Patent: Jan. 7, 2025

(54) INFORMATION PROCESSOR APPARATUS, CONTROL PROGRAM, AND CONTROL METHOD

(71) Applicant: mixi, Inc., Tokyo (JP)

(72) Inventors: Takeshi Ikeda, Tokyo (JP); Hirotake Teruuchi, Tokyo (JP)

(73) Assignee: MIXI, INC., Tokyo (JP)

( * ) Notice: Subject to any disclaimer, the term of this patent is extended or adjusted under 35 U.S.C. 154(b) by 136 days.

(21) Appl. No.: 17/702,930

(22) Filed: Mar. 24, 2022

(65) Prior Publication Data

US 2022/0222764 A1 Jul. 14, 2022

Related U.S. Application Data

(63) Continuation-in-part of application No. PCT/JP2020/025543, filed on Jun. 29, 2020.

(30) Foreign Application Priority Data

Sep. 27, 2019 (JP) ................................ 2019-178104

(51) Int. Cl.
*G07F 17/32* (2006.01)
*G06Q 50/34* (2012.01)

(52) U.S. Cl.
CPC ......... *G06Q 50/34* (2013.01); *G07F 17/3232* (2013.01); *G07F 17/3288* (2013.01)

(58) Field of Classification Search
CPC ............... G07F 17/323; G07F 17/3288; G07F 17/3232; G06Q 50/34
See application file for complete search history.

(56) References Cited

U.S. PATENT DOCUMENTS

2004/0192435 A1 9/2004 Marshall et al.
2017/0092069 A1* 3/2017 Pececnik ............ G07F 17/3269

FOREIGN PATENT DOCUMENTS

GB 2526862 A 12/2015
JP 2001188847 A 7/2001
(Continued)

OTHER PUBLICATIONS

Extended European Search Report mailed Jul. 27, 2023 for European Patent Application No. 20870295.1 to Mixi, Inc.
(Continued)

*Primary Examiner* — James S. McClellan
*Assistant Examiner* — Ross A Williams
(74) *Attorney, Agent, or Firm* — Vorys, Sater, Seymour and Pease LLP

(57) ABSTRACT

An information processor apparatus that can communicate with a terminal device used by a user over a communication network, and the apparatus is configured of an acquisition unit that acquires betting information indicating that the first user has made a bet based on provider-designated betting ticket information that indicates betting ticket information designated by a provider that provides betting ticket information related to a betting ticket for betting a prescribed value on a predicted result of racing, a notification unit that notifies, when the betting information is acquired, a terminal device of the second user who has a prescribed relationship with the first user of information related to the provider by using a prescribed relationship information, and a reception unit that receives a betting ticket based on the provider-designated betting ticket information from the second user based on the notified information related to the provider.

9 Claims, 19 Drawing Sheets

(56) References Cited

FOREIGN PATENT DOCUMENTS

| | | | |
|---|---|---|---|
| JP | 2009230541 | A | 10/2009 |
| JP | 2010160612 | A | 7/2010 |
| JP | 2015127921 | A | 7/2015 |
| JP | 2018000938 | A | 1/2018 |
| WO | 2016201515 | A1 | 12/2016 |

OTHER PUBLICATIONS

Notice of Reasons for Refusal of JP Patent Application No. 2021-022522, filed Feb. 16, 2020, issued May 21, 2024.
International Search Report and Opinion for related PCT App No. PCT/JP2020/025543 dated Sep. 29. 2020, 9 pages (partial translation).

* cited by examiner

FIG.4A

DISTRIBUTOR BETTING TICKET INFORMATION DB

51

| DISTRIBUTOR ID | RACE ID | BETTING TICKET | PURCHASED AMOUNT | VIDEO CONTENT ID |
|---|---|---|---|---|
| A | R01 | 1-9 | 100 | 0010 |
| ... | ... | ... | ... | ... |

FIG.4B

USER TICKET INFORMATION DB

52

| USER ID | RACE ID | BETTING TICKET | PURCHASED AMOUNT | PURCHASED Pt | DISTRIBUTOR ID |
|---|---|---|---|---|---|
| 0001 | R01 | 1-9 | 100 | 0 | A |
| ... | ... | ... | ... | ... | ... |

FIG.4C

GROUP INFORMATION DB

53

| USER ID | GROUP ID |
|---|---|
| 0001 | Gr1 |
| 0002 | Gr1 |
| 0003 | Gr3 |
| ... | ... |

SCREEN STATUS MANAGEMENT DB

54

| USER ID | DISTRIBUTOR ID | VIDEO CONTENT ID | BEFORE PREDICTION SCREEN NEGATIVE FLAG |
|---|---|---|---|
| 0001 | A | 0010 | 1 |
| ··· | ··· | ··· | ··· |

FIG. 15

INFORMATION PROCESSOR APPARATUS, CONTROL PROGRAM, AND CONTROL METHOD

CROSS-REFERENCE TO RELATED APPLICATION

This application is a continuation of International Application PCT/JP2020/025543 filed on Jun. 29, 2020 and designated the U.S., the entire contents of which are incorporated herein by reference. The International Application PCT/JP2020/025543 is based upon and claims the benefit of priority of the prior Japanese Patent Application No. 2019-178104, filed on Sep. 27, 2019, the entire contents of which are incorporated herein by reference.

FIELD

The present invention relates to an information processor apparatus, a control program, and a control method.

BACKGROUND

In recent years, various services have been provided over communication networks with exponential spread of the Internet and improvement of communication environments. A betting ticket purchase system has been disclosed as one example of those services, which allows for betting on government-controlled public racing such as horse racing, motorboat racing, and bicycle racing.

Another example of those services includes video distribution services. A video distribution service receives uploads from users who desire to provide video contents and distributes the video contents to users who desire to view the video contents.

As a technology related to these services, a game provider system has been disclosed that provides multiplayer electronic games played by multiple players (as an example, see Japanese Laid-Open Patent Application No. 2018-000938). This game provider system includes storage means for storing a database that associates information for identifying characters each operated by respective players with details of activities performed in the electronic game through operations of players, and display means for associating a character with the details of activities related to the corresponding player with reference to the database and for displaying the association in a lobby where the multiple players exchange information.

SUMMARY

An information processor apparatus according to one mode of the present invention that can communicate with a terminal device used by a user over a communication network, and the apparatus includes an acquisition unit configured to acquire betting information indicating that the first user has made a bet based on provider-designated betting ticket information that indicates betting ticket information designated by a provider that provides betting ticket information related to a betting ticket for betting a prescribed value on a predicted result of racing, a notification unit configured to notify, when the betting information is acquired, a terminal device of the second user, who has a prescribed relationship with the first user, of information related to the provider by using a prescribed relationship information, and a reception unit configured to receive a betting ticket based on the provider-designated betting ticket information from the second user based on the notified information related to the provider.

BRIEF DESCRIPTION OF DRAWINGS

FIGS. 4A to 4C are diagrams illustrating examples of the data structures of databases managed by a server, respectively, according to the present embodiment;

FIG. 15 is a diagram illustrating an example of a configuration of a viewing stop management DB 54 according to an additional embodiment;

DESCRIPTION OF EMBODIMENTS

One example of the above-described video distribution services is a service for distributing video contents related to predictions of government-controlled public racing. In the video contents related to predictions of government-controlled public racing, a distributor predicts the order of arrival in a public racing, for example, and a viewer may possibly purchase a betting ticket based on the prediction. In the past, however, even when a user had purchased a betting ticket by referring to a prediction of a distributor, no technologies could lead the third party to betting actions.

In more specific example, a player may be notified of action information of his/her friends in multiplayer electronic games played by multiple players. In the above-described game provider system, for example, details of activities that every characters have performed in the lobby are displayed.

However, even when the activities of every characters are notified, associations between their actions were not clear because the actions of the characters are independent from each other. More specifically, whether an action of a user X links up with an action of a user Y or not was unclear.

This fact that associations between actions are unclear is not limited to just electronic games. No betting ticket purchase systems that focus on associations between actions have found in the conventional art, and no technologies could lead the third party to betting actions when a user had purchased a betting ticket by referring to a prediction of a distributor.

The present invention provides a technology for making a prescribed notification to the second user when the first user purchases a betting ticket based on a prediction of a distributor and for accepting a purchase request of a betting ticket from the second user that is made in response to the notification.

Figure 1:
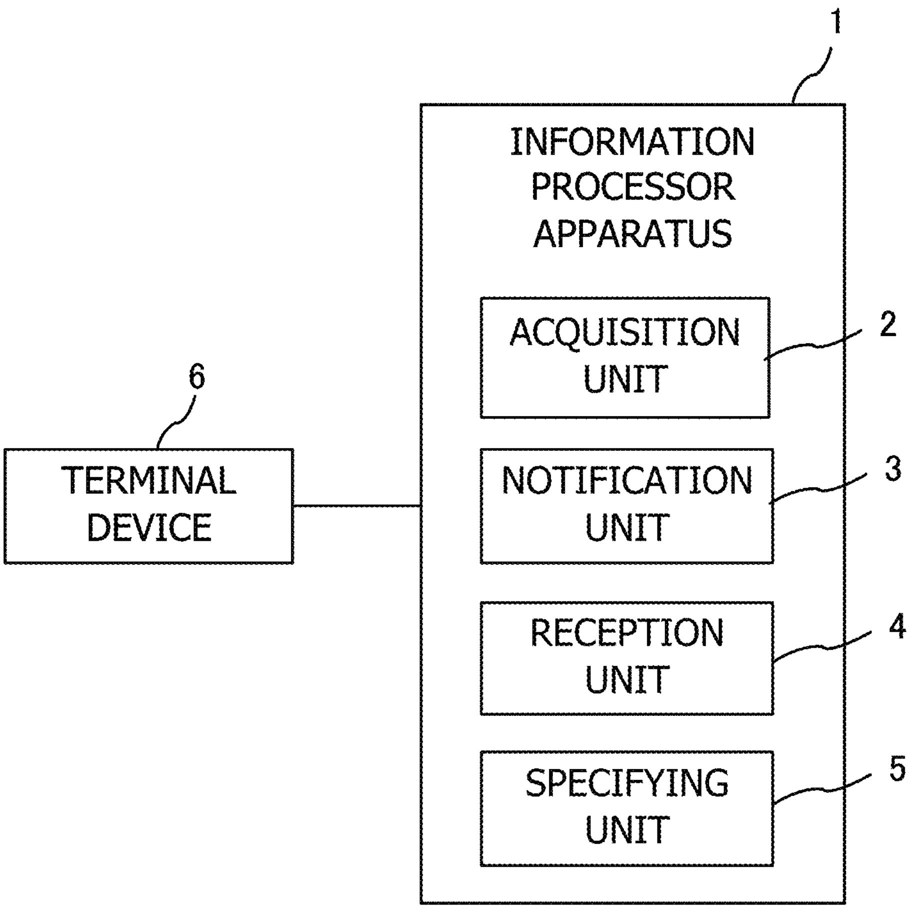
FIG. 1 is a diagram illustrating an example of the information processor apparatus according to the present embodiment.

FIG. 1 is a diagram illustrating an example of an information processor apparatus according to the present invention. An information processor apparatus 1 is an information processor that can communicate with a terminal device 6 used by a user over a communication network. As one of the embodiments, the information processor apparatus 1 includes an acquisition unit 2, a notification unit 3, and a reception unit 4. One example of the information processor apparatus 1 is a server 16, which is described later. One example of the terminal device 6 is a user terminal 12, which is described later.

The acquisition unit 2 acquires betting information indicating that the first user has made a bet based on provider-designated betting ticket information indicating betting ticket information designated by a provider (or a distributor, which is described later as an example) which provides betting ticket information related to a betting ticket for betting a prescribed value on a predicted result of racing. An example of the acquisition unit 2 is a user betting ticket information acquisition unit 46, which is described later. The prescribed value may be, for example, money such as betting money, any valued items, or points that have no monetary value.

When the betting information is acquired, the notification unit 3 notifies a terminal device of the second user who has a relationship with the first user of information related to the provider by using prescribed relationship information. The notification may be a push notification, which is described later, a toast notification, which is described later, or a message in a group chat, which is also described later. An example of the notification unit 3 is a notification controller unit 48, which is described later.

The reception unit 4 receives a betting ticket based on the provider-designated betting ticket information from the second user in response to the notified information related to the provider. One example of the reception unit 4 is a user betting ticket information acquisition unit 46, which is described later.

The above-described configuration allows for a prescribed notification to the second user when the first user purchased a betting ticket based on a prediction of a distributor and reception of a betting ticket purchase request from the second user that was made in response to the notification.

As the information related to the provider, the notification unit 3 may make a notification of at least one piece of information from among information notifying the second user of the first user's purchase of a betting ticket based on the provider-designated betting ticket information and provider-related information that is the information related to the provider.

This configuration allows for, for example, notifying the second user of information that the first user purchased a betting ticket based on the prediction of a distributor and details of the prediction made by the distributor.

When a content related to the provider-designated betting ticket information is not displayed on the terminal device 6 of the second user, the notification unit 3 may notify the terminal device 6 of the second user of information related to the content related to the provider-designated betting ticket information as the information related to the provider.

This configuration allows for, for example, making a notification to the terminal device 6 of the second user even when a content related to the provider-designated betting ticket information is not active (e.g., in an inactivated state) in the terminal device 6 of the second user. The terminal device 6 of the second user that has received the notification displays details of the notification.

Here, the prescribed relationship information may be group information related to a preset group of users. In this case, the notification unit 3 may notify the terminal device 6 of the second user who is in the same group as the group of the first user of information based on the provider by using the group information.

This configuration allows for notifying a user in the same group of a purchase trend of other users. As a result, depending on the relationship between users, the first user's betting ticket purchase trend may encourage the second user to purchase a betting ticket and may lead the second user to actually purchase a betting ticket.

As an additional embodiment, the information processor apparatus 1 may include a specifying unit 5, a notification unit 3, and a reception unit 4. The specifying unit 5 specifies a video content selected by the first user from among one or more video contents distributed by a provider. An example of the specifying unit 5 is a distribution controller unit 43, which is described later. At that time, the notification unit 3 notifies a terminal device of the first user of betting ticket information of racing associated with the specified video content at a prescribed timing associated with the video content. The reception unit 4 receives a betting ticket based on the notified betting ticket information from the first user. An example of the notification unit 3 is a notification controller unit 48, which is described later. An example of the reception unit 4 is a user betting ticket information acquisition unit 46, which is described later.

Note that the notification unit 3 may notify the terminal device of the first user not only of the betting ticket information on racing associated with the specified video content but also of link information to the video content, for example, together with the betting ticket information.

Here, the prescribed timing associated with the video content may be, for example, a timing at which information on the prediction on betting made by a distributor was registered, under such a condition that a user had once viewed a video distributed by a distributor but has not viewed the distributed video again since then. The condition that a user had once viewed a video distributed by a distributor but has not viewed the distributed video again since then is, for example, a case in which a screen negative notification, which is described later, was made. As another example of the prescribed timing, the terminal device of the first user may receive a notification at any timing before the betting deadline of the racing associated with the video content (e.g., 15 minutes before the betting deadline).

Even under the condition that a user had once viewed a video distributed by a distributor but has not viewed the distributed video again since then, this configuration notifies the user of a message informing that information on the prediction of the distributor was registered, advising the user to place a bet. This prevents the user's loss of betting opportunity and also prevents a loss of opportunity for adopting the prediction on betting made by the distributor.

The notification unit 3 may, when a betting ticket based on the notified betting ticket information is received from the first user, notify the terminal device of the second user who is viewing the specified video content of information that the first user purchased the betting ticket.

When the second user, who has a prescribed relationship with the first user, is considering the purchase of a betting ticket after viewing a video content of a distributor A, this configuration can notify the terminal device of the second user of information that the first user purchased a betting ticket based on the prediction of the distributor A. This configuration consequently encourages the second user to purchase a betting ticket that the second user is considering.

Note that not only in a case in which the second user is viewing the specified video content, but also in the condition that the second user had once viewed the specified video content but has not viewed the distributed video content again since then (case 1), the terminal device of the second user may be notified of the information that the first user purchased a betting ticket based on the prediction of the distributor of the video content. The terminal device of the second user may be notified of the information that the first user purchased a betting ticket based on the prediction of the distributor of the video content also in a case in which the second user had viewed other video contents of the distributor of the video content (case 2). Alternatively, in either case 1 or case 2 and when the second user has not yet placed a bet, the terminal device of the second user may be notified of information that the first user purchased a betting ticket based on the prediction of the distributor of the video content. Here, when the second user has not placed a bet may be a case in which the second user has not purchased any betting ticket for the race or may be a case in which the second user has not purchased a betting ticket based on the prediction of the distributor of the video content.

Figure 2:
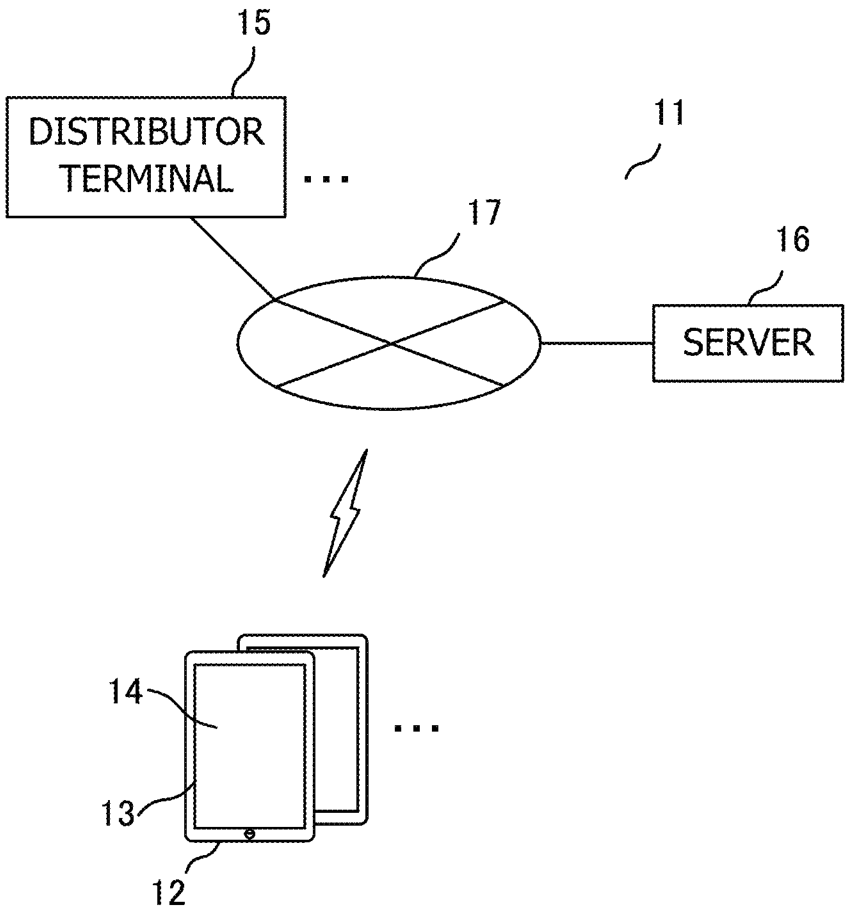
FIG. 2 is a diagram illustrating an example of a network configuration of a betting ticket purchase system according to the present embodiment.

FIG. 2 is a diagram illustrating an example of a network configuration of the betting ticket purchase system according to the present embodiment. A betting ticket purchase system 11 includes one or more user terminal(s) 12, one or more distributor terminal(s) 15, a server 16, and a communication network 17. One or more user terminal(s) 12, one or more distributor terminal(s) 15, and the server 16 are connected so as to communicate with each other over the communication network 17.

The user terminal 12 is, for example, a portable electronic terminal device such as a smartphone, a table terminal, a cellular phone carried by a user, which has communication functions that can connect to the communication network 17. The user terminal 12 has an operation display unit 13, a microphone from which sound is input, a speaker that outputs sound, and others. The operation display unit 13 is a device that allows for input operations to a screen 14 as well as a device that displays images on the screen 14, and can be, for example, a touch-screen display. Note that the user terminal 12 can be a so-called personal computer.

The user terminal 12 can download and install a prescribed application program from a download site for application programs on the Internet. The user, by performing an input operation to the operation display unit of the user terminal 12, can operate the application program. In the present embodiment, as an example, a dedicated application software that allows for purchasing betting tickets of public racing such as horse racing, motorboat racing, bicycle racing and also allows for browsing a prediction on the order of arrival made by a distributor (hereinafter referred to as "dedicated application software") is installed on the user terminal 12.

By activating this dedicated application software on the user terminal 12, the user can let the user terminal 12 access the server 16. When the user terminal 12 accesses to the server 16, input of a preregistered user ID may be required.

When the dedicated application software installed on the user terminal 12 is activated, the screen 14 of the user terminal 12 displays a graphical user interface (GUI) screen, which is described later. The GUI screen displays a video content related to a prediction on the order of arrival of racing made by a distributor, and betting ticket information etc. By referring to the video content etc. displayed on the GUI screen, the user predicts the order of arrival of the racing and purchases a betting ticket through the user terminal 12 by making a prescribed input.

When the purchased betting ticket became a winning ticket as a result of the race, the user receives a dividend based on a dividend cover (also referred to as "odds"). Note that the purchase of betting tickets can be either a purchase for monetary value or a purchase for non-monetary value. In the case of purchasing betting tickets for monetary value, the dividend is paid in money for example. A user ID therefore is associated with a credit card number or a bank account number of the user, for example, for the payment. In the case of purchasing betting tickets for non-monetary value, the purchase can be made by using points (that have no value as a currency) that can be used within the betting ticket purchase system 11.

The distributor terminal 15 is an information communication terminal device, such as a computer, a smartphone, a table terminal, a cellular phone used by a distributor, which has communication functions that can connect to the communication network 17. In the present embodiment, the distributor terminal 15 may be a personal computer as an example. The distributor terminal 15 has an imaging device that allows the distributor to make and distribute a video. The imaging device may be built into the distributor terminal 15 or may be an external type device.

The distributor accesses to the server 16 by using the distributor terminal 15. The distributor then distributes a video content (the video content related to a prediction on the order of arrival of racing) that has been made by using the imaging device to the user terminal 12 via the server 16.

The server 16 is an information processor apparatus that manages a dedicated application program installed on the user terminal 12. For example, the server 16 can stream a video content posted by the distributor terminal 15 to the user terminal 12. The server 16 can also perform payment processing etc. for the betting ticket purchase in response to an instruction to purchase a betting ticket from the user terminal 12 or the distributor terminal 15. The server 16 may be a server system configured of one or more physical information processor apparatus(es) or may be a virtual server system configured of one or more virtual server device(s).

Figure 3:
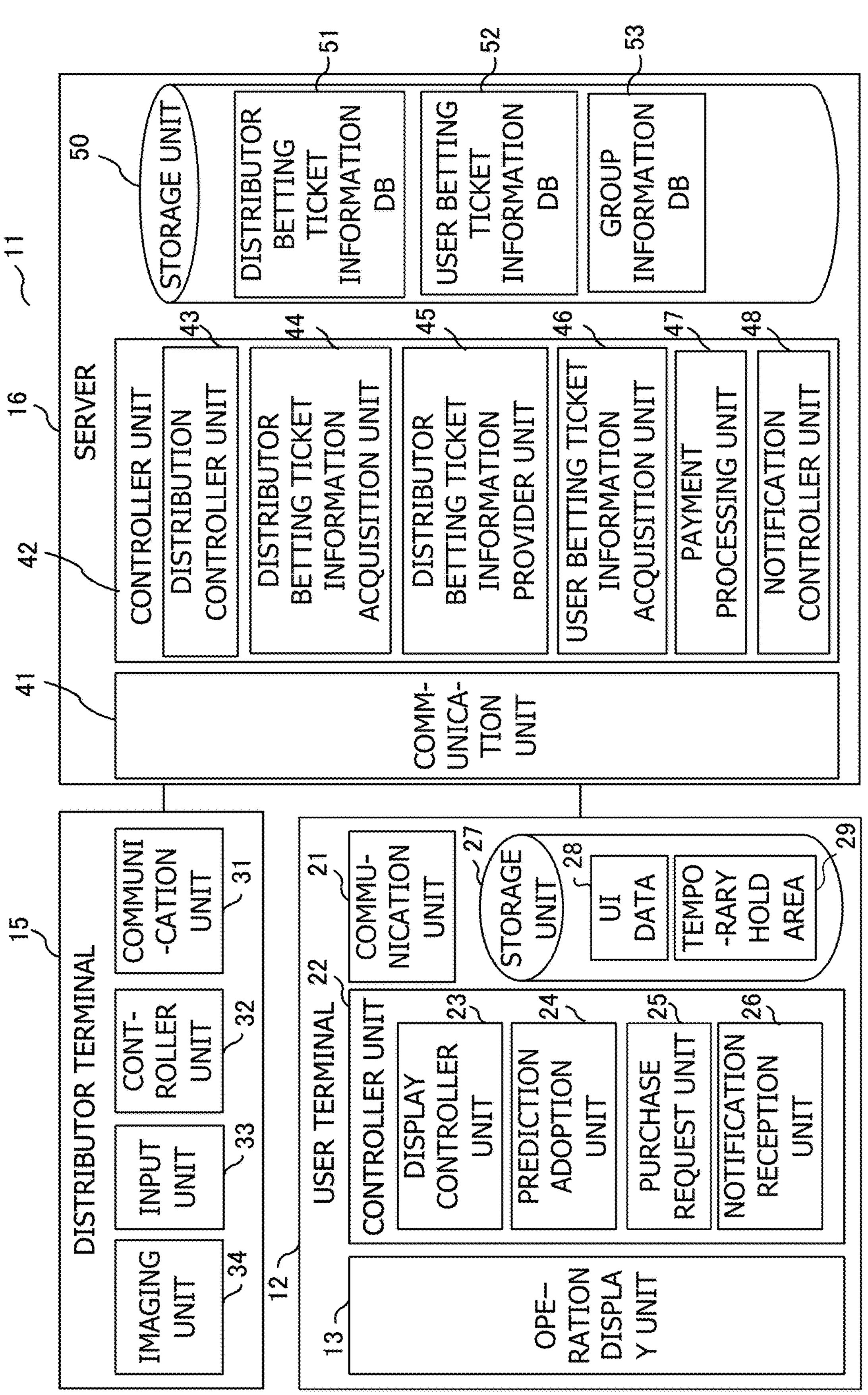
FIG. 3 is a diagram illustrating an example of functional blocks of the betting ticket purchase system according to the present embodiment.

FIG. 3 is a diagram illustrating an example of functional blocks of betting ticket purchase system 11 according to the present embodiment. In the fowling description, functions of the user terminal 12, the distributor terminal 15, and the server 16 are explained.

The user terminal 12 includes an operation display unit 13, a communication unit 21, a controller unit 22, and a storage unit 27. The communication unit 21 is an interface that enables communication with devices that are connected to the communication network 17. Here, the communication unit 21 communicates with the server 16 over the communication network 17.

The operation display unit 13 is a touch-screen display that allows a user to make inputs through an input operation and that is displayable. Although a touch-screen display is used in the present embodiment as an example, the present embodiment is not limited to the touch-screen display, but an input unit and a display unit may be separate and independent units.

The controller unit 22 controls overall operations of the user terminal 12. The controller unit 22 functions as a display controller unit 23, a prediction adoption unit 24, a purchase request unit 25, and a notification reception unit 26 by executing the application program according to the present embodiment.

The display controller unit 23 controls a display status of the screen 14 based on user interface (UI) data 28 of the dedicated application program stored in the storage unit 27. In addition, the display controller unit 23 communicates with the server 16 and displays on the screen 14 the video content designated by a distributor and the betting ticket information designated by the distributor. Here, the betting ticket information designated by the distributor includes betting ticket information of the prediction on the order of arrival made by the distributor (a betting ticket that has not been purchased) and a purchased betting ticket.

When receiving an instruction to adopt the betting ticket information designated by the distributor in response to an operation from the operation display unit 13, the prediction adoption unit 24 keeps the designated betting ticket information in a prescribed temporary hold area 29. At that time, in response to the operation from the operation display unit 13, the prediction adoption unit 24 can keep a portion or the entirety of the betting ticket information designated by the distributor in the prescribed temporary hold area 29. Moreover, in response to the operation from the operation display unit 13, the prediction adoption unit 24 may add a new piece of betting ticket information based on the prediction of the user to the information related to the betting ticket held in the temporary hold area 29.

The purchase request unit 25, in response to an instruction from the operation display unit 13, transmits to the server 16 a purchase request for purchasing a betting ticket of betting ticket information held in the temporary hold area 29. The purchase request unit 25 receives a purchase completion notification from the server 16 that has performed the payment processing of the purchase request.

The notification reception unit 26 receives from another user a notification that the user has purchased a betting ticket by referring to the betting ticket information designated by a distributor. In response to the notification received by the notification reception unit 26, the display controller unit 23 displays on the screen 14 such information that another user has purchased a betting ticket by referring to the betting ticket designated by a distributor. At the same time, the display controller unit 23 displays and asks the user of this user terminal whether or not to purchase a betting ticket by referring to the betting ticket designated by the distributor. In addition, when an input operation indicating an intention of purchasing a betting ticket by referring to the betting ticket designated by the distributor is made through the operation display unit 13, the display controller unit 23 displays a screen to purchase a betting ticket by referring to the betting ticket designated by the distributor.

Here, another user is a user who has formed a relationship with the user of this user terminal in advance, and another user can exchange messages and form a group (community) by being connected as a so-called "friend". The so-called "friend" is a relationship formed on the basis of a mutual agreement made through a friend request from a user on one side and acceptance of the friend request by a user on the other side.

Note that a group may be automatically formed on the basis of information that is registered in advance in both users. For example, when both users have the telephone numbers or the mail addresses of each other registered in their user terminals 12, the server 16 may automatically put the users in the same group. Or, the server 16 may also put users who have viewed video contents of the same distributor in the same group.

The storage unit 27 stores installed programs (including the dedicated application program according to the present embodiment) and various types of data. According to the present embodiment, the storage unit 27 stores the UI data 28 etc. as an example. Here, data includes graphical data in addition to status information and text data.

The storage unit 27 also has the temporary hold area 29 that temporarily holds betting ticket information designated by the user. When the betting ticket information designated by the distributor is adopted, the temporary hold area 29 can temporarily have a portion or the entirety of the adopted betting ticket information. The temporary hold area 29 holds, for example, information to specify racing (a race name or a race ID etc.), a combination of numbers, betting money (or betting points) on the combination of numbers, information to specify a distributor (a distributor name or a distributor ID etc.) of betting ticket information when the betting ticket information is held by the prediction adoption unit 24.

The distributor terminal 15 includes a communication unit 31, a controller unit 32, an input unit 33, and an imaging unit 34. The communication unit 31 is an interface that enables communications with devices connected to the communication network 17. The communication unit 31 communicates with the server 16 over the communication network 17.

The controller unit 32 controls overall operations of the distributor terminal 15. The controller unit 32 distributes a video content captured by the imaging unit 34 to the user terminal(s) 12 through the server 16 in response to an instruction from the input unit 33.

The input unit 33 is an input interface for inputting instructions to the controller unit 32 and for inputting instructions or data. By using the input unit 33, a distributor inputs details of the prediction on the order of arrival in target racing, purchases a betting ticket, and inputs instructions related to distribution of video contents. The imaging unit 34 is an imaging device such as CCD (Charge Coupled Device).

The server 16 includes a communication unit 41, a controller unit 42, and a storage unit 50. The communication unit 41 is an interface that enables communications with devices connected to the communication network 17. The communication unit 41 communicates with the user terminal (s) 12 and the distributor terminal(s) 15 over the communication network 17.

The controller unit 42 controls overall operations of the server 16. The controller unit 42 at the same time makes a control of executing processing in response to a request from the user terminal(s) 12 or the distributor terminal(s) 15 and of returning an execution result to the user terminal(s) 12 or the distributor terminal(s) 15. By executing the application program according to the present embodiment, the controller unit 42 functions as a distribution controller unit 43, a distributor betting ticket information acquisition unit 44, a distributor betting ticket information provider unit 45, a user betting ticket information acquisition unit 46, a payment processer unit 47, and a notification controller unit 48.

The distribution controller unit 43 receives a video content captured by a distributor in response to a distribution request from the distributor. In addition, the distribution controller unit 43 distributes the received video content to the user terminal(s) 12 in which the dedicated application program is activated.

The distributor betting ticket information acquisition unit 44 acquires betting ticket information designated by the distributor (distributor betting ticket information). Here, the distributor betting ticket information includes information of the prediction on the order of arrival in racing that is input by the distributor and betting ticket information of the betting ticket that the distributor purchased.

The distributor betting ticket information provider unit 45 associates the distributor betting ticket information acquired by the distributor betting ticket information acquisition unit 44 with a video content of the corresponding distributor and provides the associated information to the user terminal(s) 12.

The user betting ticket information acquisition unit 46 acquires betting ticket information of a user held in the temporary hold area 29 of a user terminal 12 in response to a betting ticket purchase request from the user terminal 12.

The payment processer unit 47 executes payment processing for purchasing a betting ticket based on the betting ticket information of the user acquired by the user betting ticket information acquisition unit 46. The payment processing is executed on the basis of a credit card or an account number etc. registered in advance.

When the payment is completed for a betting ticket that a user X purchased by referring to a betting ticket designated by a distributor, the notification controller unit 48 extracts a user Y who has previously formed a relationship with the user X from a group information DB 53. When the user Y who has a relationship with the user X is extracted, the notification controller unit 48 generates a notification informing that the user X has made the purchase by referring to a betting ticket designated by a distributor and including information related to the betting ticket designated by the distributor. The notification controller unit 48 transmits the generated notification to the user terminal 12 of the extracted user Y.

Note that in one example according to the present embodiment, the notification controller unit 48 not have to transmit any notification to the user terminal 12 of the user X. When the extracted user has already purchased a betting ticket by referring to the betting ticket designated by the distributor A or other distributors, the notification controller unit 48 may not need to transmit the notification to the users.

The storage unit 50 stores a distributor betting ticket information database 51, a user betting ticket information database 52, and a group information database 53. Note that a database is abbreviated as "DB" in the following description.

The distributor betting ticket information DB 51 is a database that manages betting ticket information designated by distributors. The user betting ticket information DB 52 is a database that manages information on betting tickets purchased by users. The group information DB 53 is a database that manages groups (communities) formed between users.

FIGS. 4A to 4C are diagrams illustrating examples of the data structures of databases managed by the server 16, respectively, according to the present embodiment.

The distributor betting ticket information DB 51 includes data items such as "distributor ID", "race ID", "betting ticket", "purchased amount", and "video content ID". In the following description, each record in the distributor betting ticket information DB 51 may be referred to as distributor betting ticket information. The item "distributor ID" stores information to specify a distributor (distributor ID). The item "race ID" stores information to specify racing (race ID). The item "betting ticket" stores a combination of numbers of the order of arrival from the first to the prescribed order in racing (race) specified by the race ID. Note that the present embodiment does not refer to the betting types such as perfecta and quinella for explanatory convenience, but these types should not be excluded. The item "purchased amount" stores the amount of betting money corresponding to the betting ticket information. The item "video content ID" stores information to specify a video content (video content ID) of the corresponding distributor.

The user betting ticket information DB 52 includes data items of "user ID", "race ID", "betting ticket", "purchased amount", "purchased Pt", and "distributor ID". The item "user ID" stores information to specify a user (user ID). The item "race ID" stores information to specify racing (race ID). The item "betting ticket" stores a combination of numbers of the order of arrival from the first to the prescribed order in racing (race) specified by the race ID. The item "purchased amount" stores the amount of betting money corresponding to the betting ticket information (This item is used in the case of a purchase for monetary value, and the currency serves as the betting money). The item "purchased Pt" stores the amount of betting money corresponding to the betting ticket information (This item is used in the case of a purchase for non-monetary value, and the points serve as the betting money). The item "distributor ID" stores a distributor ID of a distributor when a user adopted the betting ticket designated by the distributor and purchased a betting ticket.

The group information DB 53 includes data items of "user ID" and "group ID". The item "user ID" stores information to specify a user (user ID). The item "group ID" stores information to specify a group of the user (group ID).

When a group is formed or when a user is added in a group as a new member, a record (group information) is added to the group information DB 53. For example, when a user on one side makes a friend request and a user on the other side accepts the friend request, group information is added to the group information DB 53. In another example, when both users have the telephone numbers or the mail addresses of each other registered in their user terminals 12, the server 16 registers these users as the same group members in the group information DB 53. In the other example, the server 16 registers users who have viewed video contents of the same distributor as the same group members in the group information DB 53.

Next, a user interface of the dedicated application program installed on a user terminal 12 is explained with reference to FIG. 5 to FIG. 8. When a user activates the dedicated application program in the user terminal 12, the screen 14 displays a screen for selecting a race for which a betting ticket can be purchased at that point in time. The user operates the operation display unit 13 and selects a target race. Then the screen illustrated in FIG. 5 is displayed.

Figure 5:
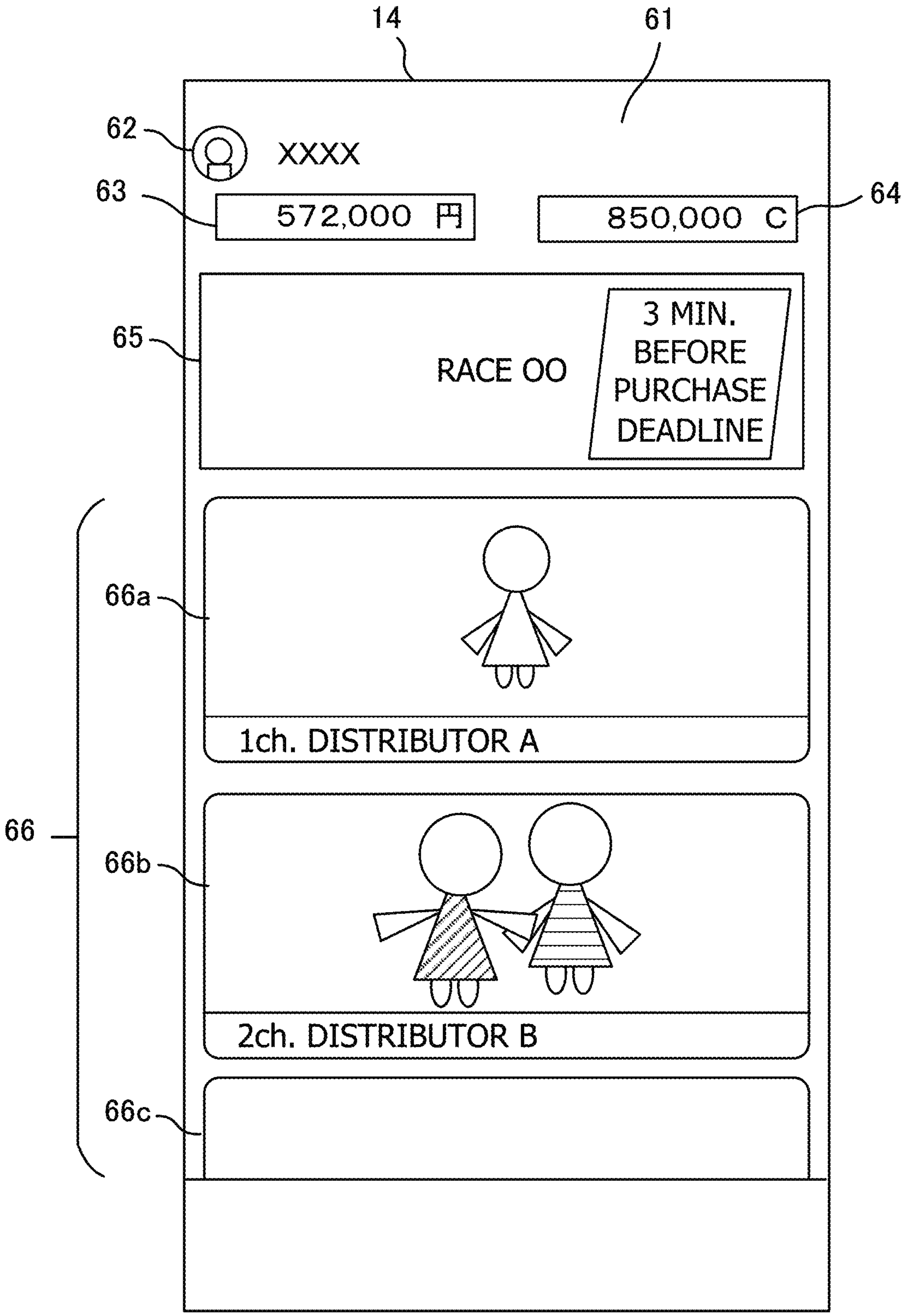
FIG. 5 is a diagram illustrating an example of a distributor selecting screen according to the present embodiment.

FIG. 5 is a diagram illustrating an example of a distributor selecting screen according to the present embodiment. A distributor selecting screen 61 includes a login user display field 62, a possessing amount display field 63, a possessing point display field 64, a purchase-target race name display field 65, and a distributor list 66.

The login user display field 62 displays a user name and an icon of user who is currently logged into the betting ticket purchase system 11 by using the user terminal 12. The possessing amount display field 63 displays the amount of money that the user currently possesses in the betting ticket purchase system 11. The possessing point display field 64 displays the points that the user currently possesses in the betting ticket purchase system 11. The purchase-target race name display field 65 displays the race name for which a betting ticket is to be purchased. Note that the purchase-target race display field 65 displays a message that informs the time remaining until the deadline of purchasing a betting ticket for the race.

The distributor list 66 displays thumbnail images 66*a*, 66*b*, 66*c*, . . . of information related to the race predictions that distributors have distributed (distributor information) for the race displayed in the purchase-target race name display field 65. The distributor list 66 can display distributor information that is not currently displayed on the screen by means of the scrolling operation with the operation display unit 13. The user taps, for example, a thumbnail image 66*a* that is distributor information of a distributor A of the distributor list 66 by using the operation display unit 13. Then the screen illustrated in FIG. 6 is displayed.

Figure 6:
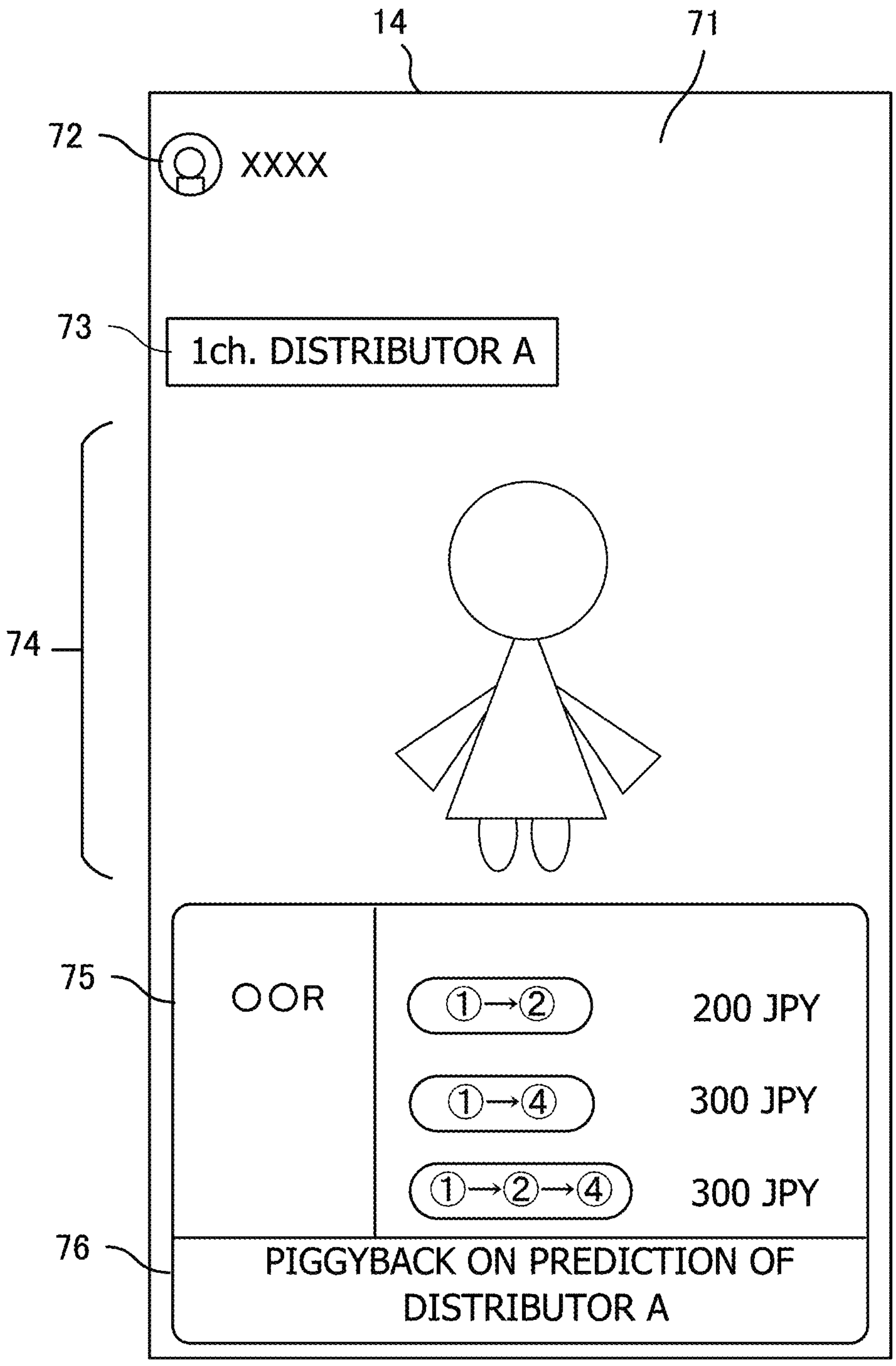
FIG. 6 is a diagram illustrating an example of a distributor prediction screen according to the present embodiment.

FIG. 6 is a diagram illustrating an example of a distributor prediction screen according to the present embodiment. A distributor prediction screen 71 includes a login user display field 72, a selected distributor display field 73, a distributor video content display field 74, a distributor betting ticket information display field 75, and a prediction adopting button 76.

Figure 7:
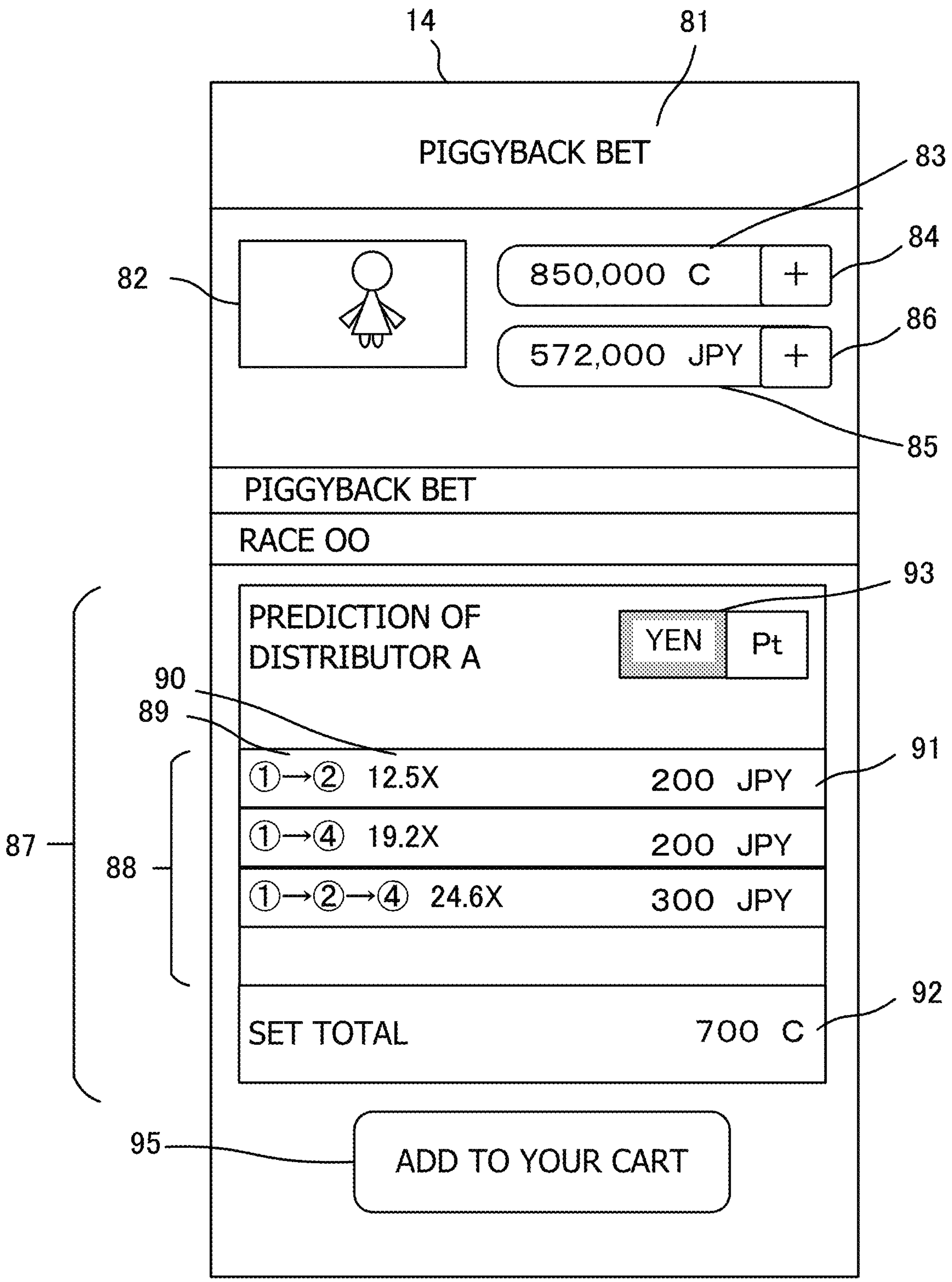
FIG. 7 is a diagram illustrating an example of a distributor-adopted prediction particulars screen according to the present embodiment.

The login user display field 72 display a user name and an icon of user who is currently logged into the betting ticket purchase system 11 by using the user terminal 12. The selected distributor display field 73 displays a distributor name etc. selected in the distributor list 66 of the distributor selecting screen 61. The distributor video content display field 74 displays a video content of the selected distributor (e.g., live streaming video). The distributor betting ticket information display field 75 displays betting ticket information designated by the distributor. The prediction adopting button 76 is a button to be pressed when the betting ticket information of the distributor is adopted and the betting ticket is purchased. In the example of FIG. 6, the prediction adopting button 76 has a caption "piggyback on prediction of distributor A". When the prediction adopting button 76 is tapped, the screen illustrated in FIG. 7 is displayed. At that time, details of the distributor betting ticket information display field 75 is stored in temporary hold area 29.

FIG. 7 is a diagram illustrating an example of an adopted distributor prediction particulars screen according to the present embodiment. The adopted distributor prediction particulars screen 81 includes a distributor video content display field 82, a possessing point display field 83, a possessing point adding designation filed 84, a possessing amount display field 85, a possessing amount adding designation field 86, a distributor-predicted betting ticket display field 87, and an "add to your cart" button 95.

The distributor video content display field 82 displays a video content of the selected distributor (e.g., live streaming video). The possessing point display field 83 displays the points that the user currently possesses in the betting ticket purchase system 11. When the possessing point adding designation filed 84 is tapped, points that are used within the betting ticket purchase system 11 can be added (charged) to purchase a betting ticket for non-monetary value. The possessing amount display field 85 displays the amount of money that the user currently possesses in the betting ticket purchase system 11. When the possessing amount adding designation field 86 is tapped, the amount of money to purchase a betting ticket for monetary value can be added (charged) to the betting ticket purchase system 11. Note that in the betting ticket purchase system 11, a betting ticket can be purchased within the charged amount of money or the charged points.

The distributor-predicted betting ticket display field 87 includes a predicted betting ticket list 88, an yen/point selection switch 93, and a total betting money/betting point display field 92. The distributor-predicted betting ticket display filed 87 displays by default combinations of numbers and the betting money or betting points of a betting ticket designated by the distributor A.

The yen/point selection switch 93 is a switch button for changing between purchasing a betting ticket for monetary value and purchasing a betting ticket for non-monetary value. A user designates "yen" to purchase a betting ticket for monetary value and designates "Pt (point)" to purchase a betting ticket for non-monetary value (when using the points within the betting ticket purchase system).

The predicted betting ticket list 88 includes a combination number display field 89, an odds display field 90, and a betting money/betting point display field 91. The combination number display field 89 is a field for displaying combinations of numbers that a bet covers, and displays some combinations of numbers designated by the distributor. In the example illustrated in FIG. 7, the predicted betting ticket list 88 displays three combinations of numbers including a combination of numbers "No. 1 for the first place, No. 4 for the second place", a combination of numbers "No. 1 for the first place, No. 4 for the second place", and a combination of numbers "No. 1 for the first place, No. 2 for the second place, No. 4 for the third place".

The odds display field 90 displays the odds corresponding to the combinations of numbers displayed in the combination number display field 89. The betting money/betting point display field 91 displays the betting money or betting points for each of the combinations of numbers. The total betting money/betting point display field 92 displays the total amount of the betting money/betting point display field 91 in the predicted betting ticket list 87*a*.

Figure 8:
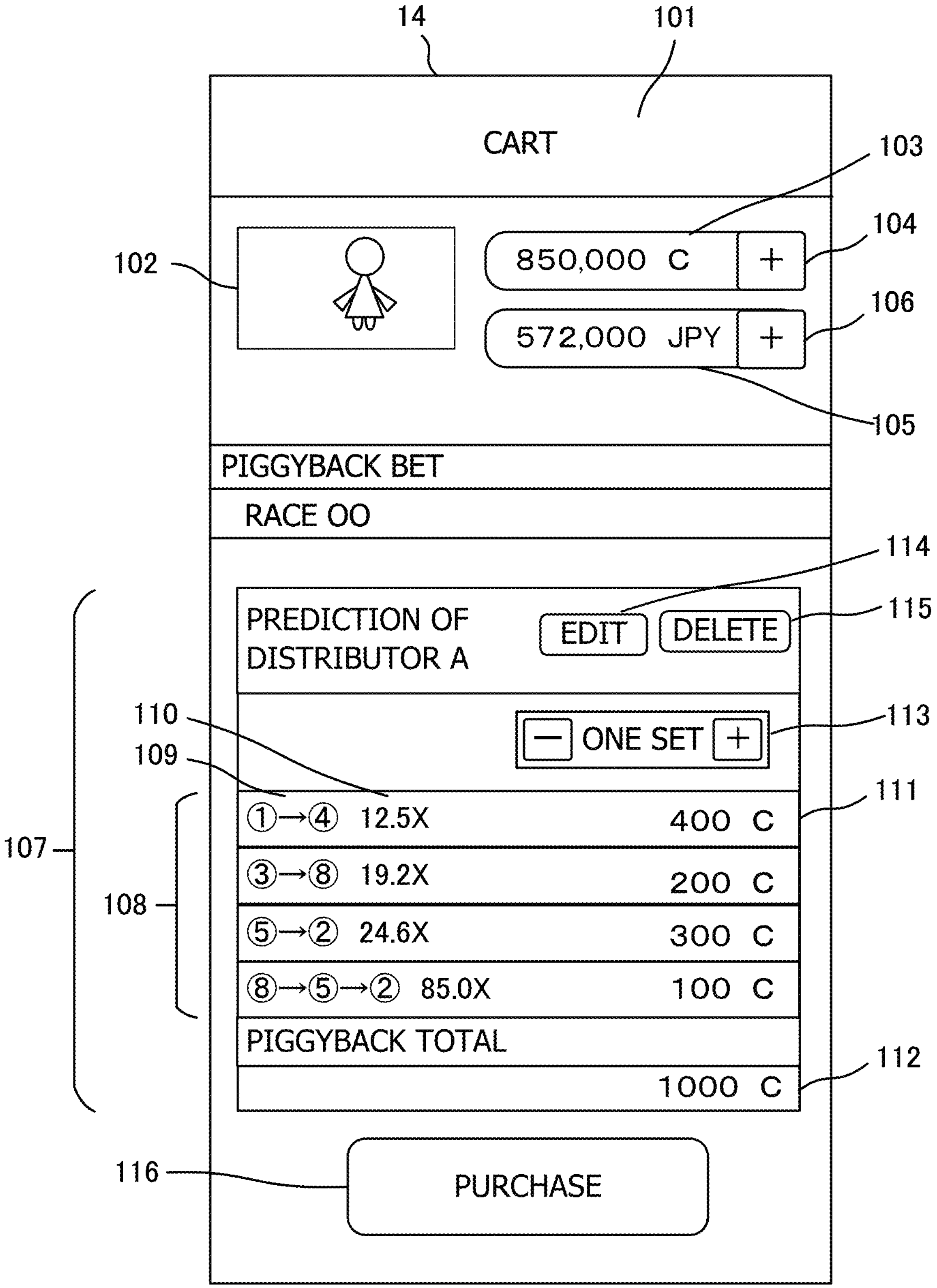
FIG. 8 is a diagram illustrating an example of a betting ticket purchase screen according to the present embodiment.

When the "add to your cart" button 95 is tapped, a betting ticket purchase screen that is explained with reference to FIG. 8 is displayed.

Note that when the prediction adopting button 76 illustrated in FIG. 6 is tapped, details of the distributor betting ticket information display field 75 is stored in the temporary hold area 29, which however does not limit the embodiment. For example, details of the distributor-predicted betting ticket display field 87 may be stored in the temporary hold area 29 when the "add to your cart" button 95 is tapped.

FIG. 8 is a diagram illustrating an example of a betting ticket purchase screen according to the present embodiment. A betting ticket purchase screen 101 includes a distributor video content display field 102, a possessing point display field 103, a possessing point adding designation field 104, a possessing amount display field 105, a possessing amount adding designation field 106, a distributor-predicted betting ticket display field 107, and a purchase execution button 116.

Because the distributor video content display field 102, the possessing point display field 103, the possessing point adding designation field 104, the possessing amount display field 105, and the possessing amount adding designation field 106 are the same as the distributor video content display field 82, the possessing point display field 83, the possessing point adding designation field 84, the possessing amount display field 85, and the possessing amount adding designation field 86 in FIG. 7, respectively, the explanations of the above fields are omitted.

The distributor-predicted betting ticket display field 107 includes a predicted betting ticket list 108, a total betting money/betting point display field 112, a purchase in sets buttons 113, an edit button 114, and a delete button 115. The distributor-predicted betting ticket display field 107 displays by default combinations of numbers and the betting money or betting points of the betting ticket designated by the distributor A.

The predicted betting ticket list 108 includes a combination number display field 109, an odds display field 110, and a betting money/betting point display field 111. Because the combination number display field 109, the odds display field 110, the betting money/betting point display field 111 and the total betting money/betting point display field 112 are the same as the betting combination number display field 89, the odds display field 90, the betting money/betting point display field 91 and the total betting money/betting point display field 92 in FIG. 7, respectively, the explanations of these fields are omitted.

The purchase in sets buttons 113 is a button for purchasing betting tickets in sets when a combination of betting tickets in the predicted betting ticket list 108 is referred to as one set. Every time a "+" button of the purchase in sets buttons 113 is tapped, the number of sets to be purchased can be increased. Every time a "−" button of the purchase in sets buttons 113 is tapped, the number of sets to be purchased can be decreased.

When the edit button 114 is tapped, details of the predicted betting ticket list 108 can be edited. Examples of the editing includes changing the monetary unit for the purchase from points (purchase for non-monetary value) to yen (purchase for monetary value), changing the monetary unit for the purchase from yen (purchase for monetary value) to points (purchase for non-monetary value), adding a new prediction of the user to the predicted betting ticket list 108, and deleting a prescribed combination(s) of numbers from the predicted betting ticket list 108. When the delete button 115 is tapped, the distributor-predicted betting ticket display field 107 can be deleted.

When the purchase execution button 116 is tapped, purchase processing of the betting ticket information designated in the betting ticket purchase screen 101 is executed.

As described above, by means of the operations on the screens illustrated in FIG. 5 to FIG. 8, a user can purchase a betting ticket by referring to the betting ticket that a selected distributor has predicted. Assume that the user X, for example, has purchased a betting ticket in the above-described manner by using his/her user terminal 12*a* and by referring to the betting ticket predicted by the distributor A. Then, the user terminal 12*b* of the user Y, who has a prescribed relationship with the user X, is notified of the information that the user X purchased a betting ticket by referring to the betting ticket predicted by the distributor A. This point is explained with reference to FIG. 9 to FIG. 11.

Figure 9:
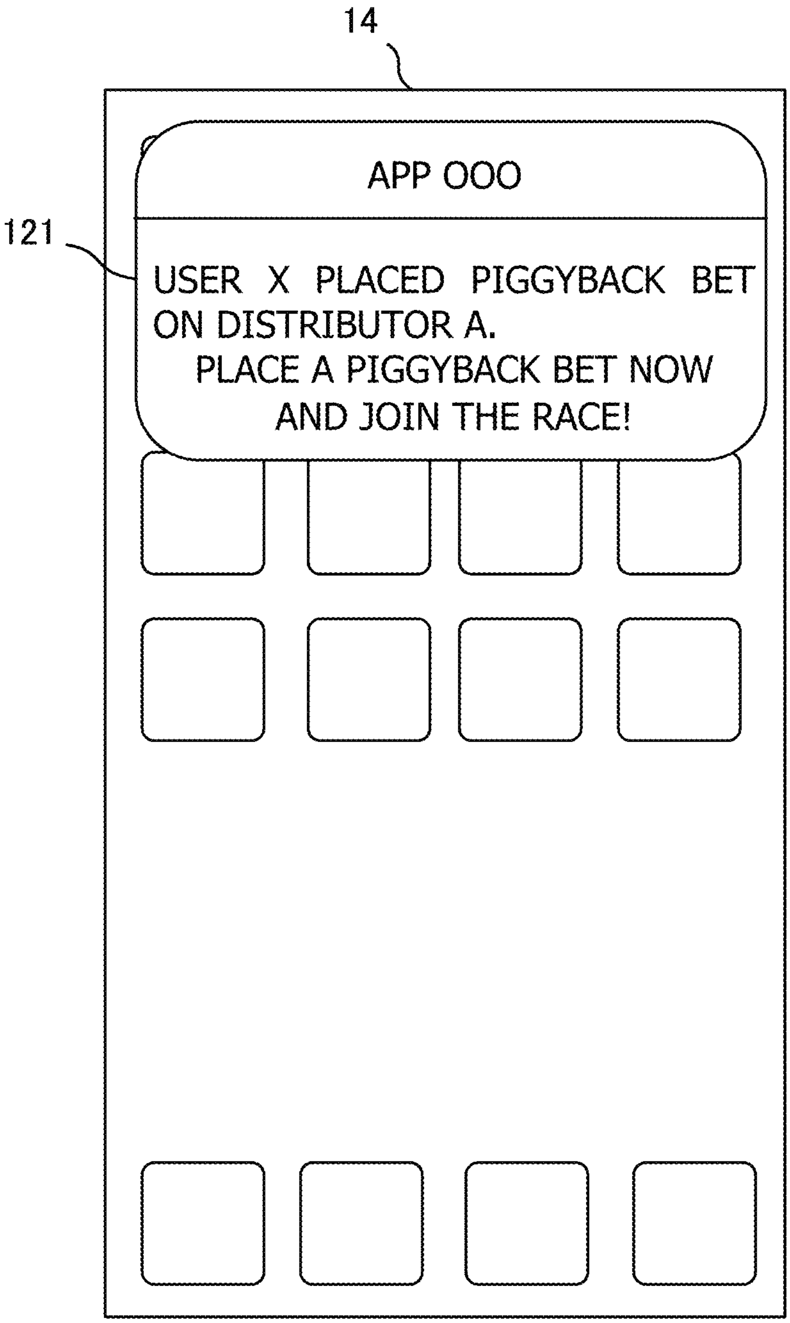
FIG. 9 is an example of notification (example 1) according to the present embodiment.

FIG. 9 is an example of a notification (example 1) according to the present embodiment. FIG. 9 illustrates an example of a push notification displayed on the screen 14 based on the notification information from the server 16 when the above-described dedicated application program is not in an active state in the user terminal 12*b*.

In FIG. 9, a message 121 of a push notification is displayed on the home screen of the operating system (OS) of the user terminal 12*b*. The message 121 displays information that the user X purchased a betting ticket by referring to the betting ticket predicted by the distributor A and advises the user Y to purchase a betting ticket in the same manner. In addition, the message 121 provides a link (link information) to the adopted distributor prediction particulars screen 81 (FIG. 7) of the betting ticket designated by the distributor A.

Here, "link information" includes information to specify a transition destination screen (e.g., a screen ID) and information to specify distributor betting ticket information of the distributor displayed in the transition destination screen (e.g., a distributor ID).

Accordingly, when the user Y taps this message 121, the dedicated application program becomes an active state and, based on the link information, the adopted distributor prediction particulars screen 81 (FIG. 7) about the betting ticket designated by the distributor A is displayed. Afterwards, by performing the operations explained in FIG. 7 and FIG. 8, the user Y can purchase a betting ticket by referring to the prediction of the distributor A as the user X did.

In this manner, even when the user terminal 12*b* of the user Y is not displaying a content of distributor betting ticket information (e.g., when the dedicated application program is not in an active state), the information related to the content of distributor betting ticket information can be displayed on the user terminal 12*b* by the push notification from the server 16.

Figure 10:
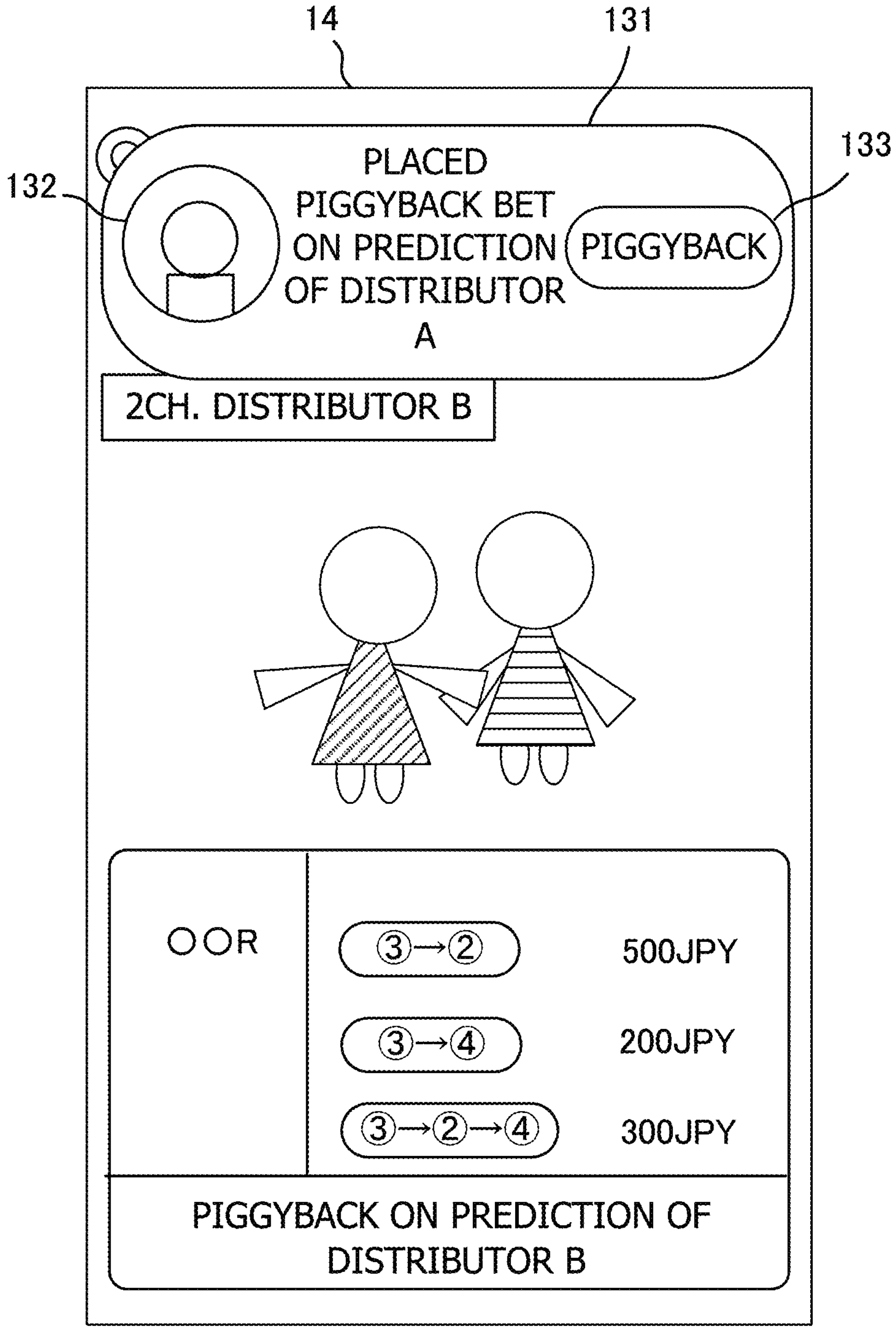
FIG. 10 is an example of notification (example 2) according to the present embodiment.

FIG. 10 is an example of a notification (example 2) according to the present embodiment. FIG. 10 illustrates an example of a toast notification that is displayed on the screen 14 based on the notification information from the server 16 when the above-described dedicated application program is in an active state in the user terminal 12*b*. The toast notification is temporarily displaying a message notification as popup.

In the example of FIG. 10, a toast notification 131 displays an icon 132 of the user X, information that the user X purchased a betting ticket by referring to the prediction of the distributor A, and a "piggyback" button 133.

The "piggyback" button 133 is a button to be tapped to piggyback on the prediction of the distributor A. The "piggyback" button 133 provides a link (link information) to the adopted distributor prediction particulars screen 81 (FIG. 7) of the betting ticket designated by the distributor A.

When the user Y taps this “piggyback” button 133, the adopted distributor prediction particulars screen 81 (FIG. 7) of the betting ticket designated by the distributor A is displayed based on the link information. Afterwards, by performing the operations explained in FIG. 7 and FIG. 8, the user Y can purchase a betting ticket by referring to the prediction of the distributor A as the user X did.

Figure 11:
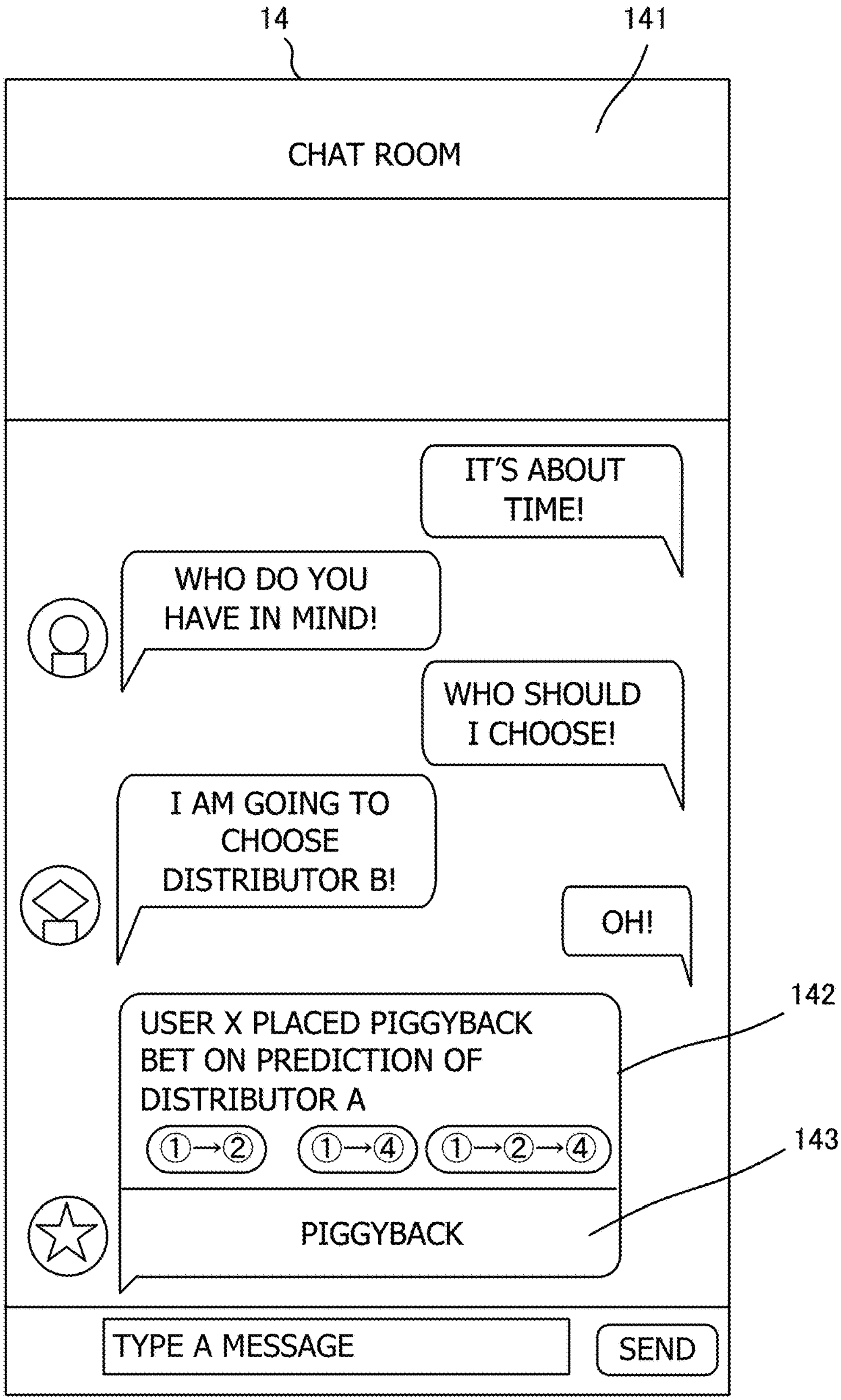
FIG. 11 is an example of notification (example 3) according to the present embodiment.

FIG. 11 is an example of a notification (example 3) according to the present embodiment. FIG. 11 is an example of a chat screen 141 displayed as a result of operating the dedicated application program. The chat screen 141 allows users in a prescribed group to exchange messages (group chat) by using a chat function of the above-described dedicated application program.

FIG. 11 illustrates an example of the message displayed when a member of a group purchased a betting ticket by referring to the prediction of the distributor A while users in the group are exchanging messages.

The message 142 displays information that the user X, who is a member of the group, purchased a betting ticket by referring to the prediction of the distributor A, details of the prediction on the order of arrival made by the distributor A, and the “piggyback” button 143.

The “piggyback” button 143 is a button to be tapped to piggyback on the prediction of the distributor A. The “piggyback” button 143 provides a link (link information) to the adopted distributor prediction particulars screen 81 (FIG. 7) of the betting ticket designated by the distributor A.

When the user Y taps this “piggyback” button 143, the adopted distributor prediction particulars screen 81 (FIG. 7) of the betting ticket designated by the distributor A is displayed based on the link information. Afterwards, by performing the operations explained in FIG. 7 and FIG. 8, the user Y can purchase a betting ticket by referring to the prediction of the distributor A as the user X did.

Figure 12:
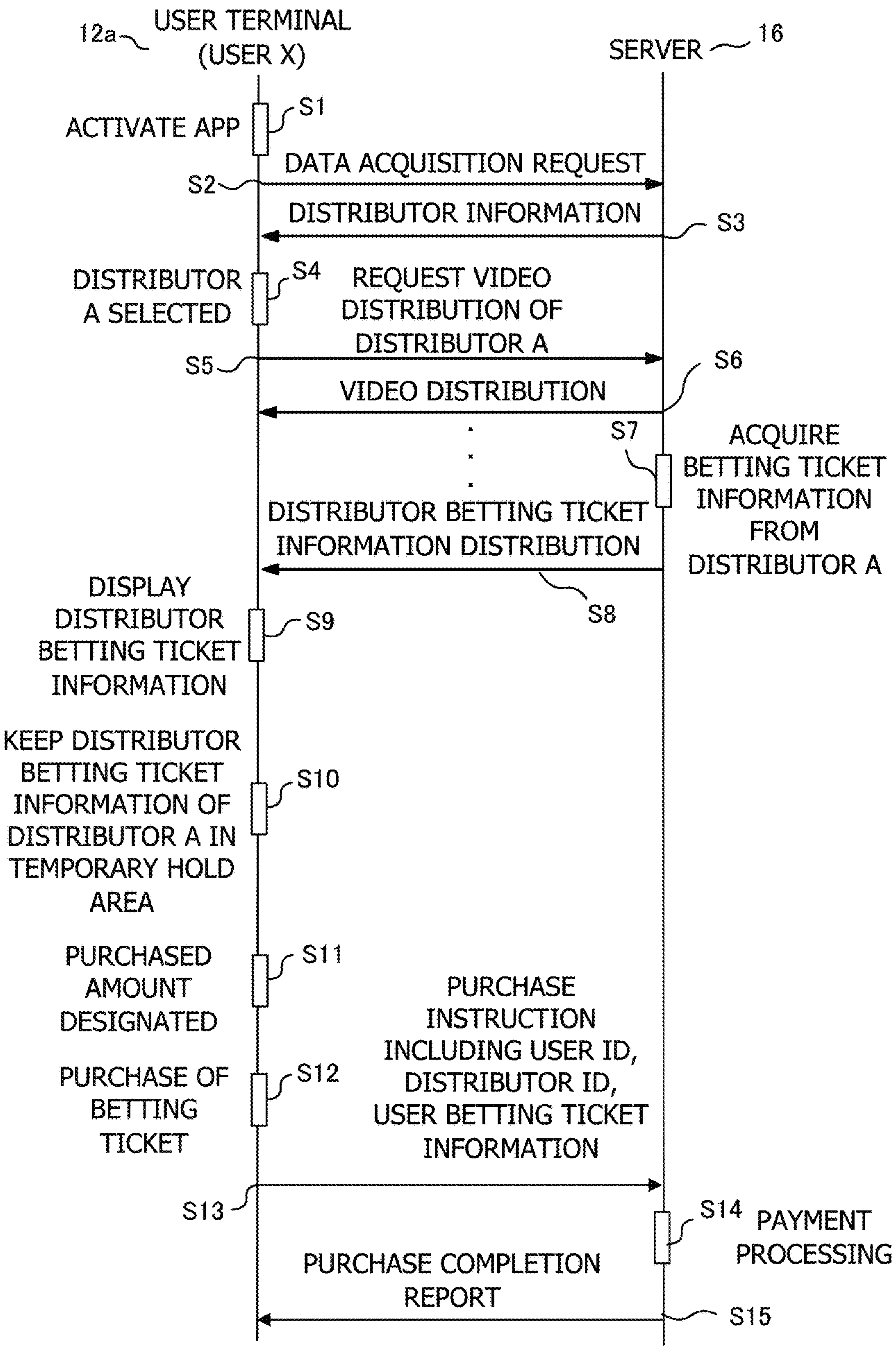
FIG. 12 is a diagram illustrating a sequence between a user terminal 12*a* and a server 16 up to a user purchasing a betting ticket by referring to the betting ticket designated by a distributor according to the present embodiment.

FIG. 12 is a diagram illustrating a sequence between the user terminal 12*a* and the server 16 up to the user X purchasing a betting ticket by referring to the betting ticket designated by a distributor according to the present embodiment. The user X operates the user terminal 12*a* and activates the dedicated application program installed in the user terminal 12*a* (S1). The user terminal 12*a* that has the dedicated application program activated makes a data acquisition request to the server 16 (S2). In response to the request, the server 16 transmits distributor information (including a distributor ID, a race ID, and a video content ID) to the user terminal 12*a* (S3).

When the user terminal 12*a* receives the distributor information from the server 16, the user terminal 12*a* displays the distributor information on the distributor list 66 illustrated in FIG. 5. The user X selects a thumbnail image 66*a* of the distributor information of the distributor A, for example, from the distributor list 66 (S4). Then the user terminal 12*a* makes a request for a video content of the distributor A based on the video content ID (S5). The user terminal 12*a* receives the video content from the server 16 responding to the request (S6). The user terminal 12*a* plays the received video content on the distributor prediction screen 71 illustrated in FIG. 6.

When the distributor A designates a combination of numbers of the order of arrival and a purchased amount in a betting ticket, the server 16 (the distributor betting ticket information acquisition unit 44) acquires the designated details (the distributor betting ticket information) (S7). The distributor betting ticket information includes a distributor ID, a race ID, a combination of numbers in the betting ticket, a purchased amount, and a video content ID. The server 16 (the distributor betting ticket information acquisition unit 44) registers the acquired distributor betting ticket information to the distributor betting ticket information DB 51. Then the server 16 (the distributor betting ticket information provider unit 45) distributes the distributor betting ticket information to the user terminals 12 (12*a*) of a user viewing a video content of the distributor A (S8).

The user terminal 12*a* displays, on the distributor betting ticket information display field 75 of the distributor prediction screen 71 illustrated in FIG. 6, the combination of numbers in the betting ticket included in the distributor betting ticket information of the distributor A transmitted from the server 16 (S9).

On the user terminal 12*a* side, the user X taps the prediction adopting button 76 in the distributor prediction screen 71 illustrated in FIG. 6. Then the user terminal 12*a* (the prediction adoption unit 24) holds the distributor betting ticket information in the temporary hold area 29 (S10). At that time, the adopted distributor prediction particulars screen 81 illustrated in FIG. 7 is displayed. In FIG. 7, when the “add to your cart” button 95 is tapped, the betting ticket purchase screen 101 illustrated in FIG. 8 is displayed.

In the betting ticket purchase screen 101, the user X may delete a portion of the distributor betting ticket information or may add betting ticket information that the user X has predicted to the distributor betting ticket information. The user X, in addition, designates the betting money (or betting points) on each piece of the betting ticket information (S11). In response to these operations, the user terminal 12*a* (the prediction adoption unit 24) updates the information held in the temporary hold area 29. In other words, the user terminal 12*a* (the prediction adoption unit 24) updates the details of the temporary hold area 29 (keeps a portion or the entirety of the betting ticket information in the temporary hold area 29) in response to the input operations in the betting ticket purchase screen 101.

When a betting ticket to be purchased is finalized, the user X taps the purchase execution button 116 in the betting ticket purchase screen 101 (S12). The user terminal 12*a* (the purchase request unit 25) transmits a purchase request that includes user betting ticket information (including the user ID, the race ID, the combination of numbers in the betting ticket, the purchase amount (or purchase Pt), and the distributor ID) to the server 16 based on the details of the temporary hold area 29 (S13).

The server 16 (the user betting ticket information acquisition unit 46) acquires the purchase request. The server 16 (the user betting ticket information acquisition unit 46) registers the details of the user betting ticket information included in the acquired purchase request to the user betting ticket information DB 52. The server 16 (the payment processor unit 47) performs payment processing of the purchase of the betting ticket based on the purchase request (S14). When the payment processing has completed, the server 16 updates the details of the user betting ticket information DB 52 based on the payment details and notifies the user terminal 12*a* of completion of the payment processing (S15).

Figure 13:
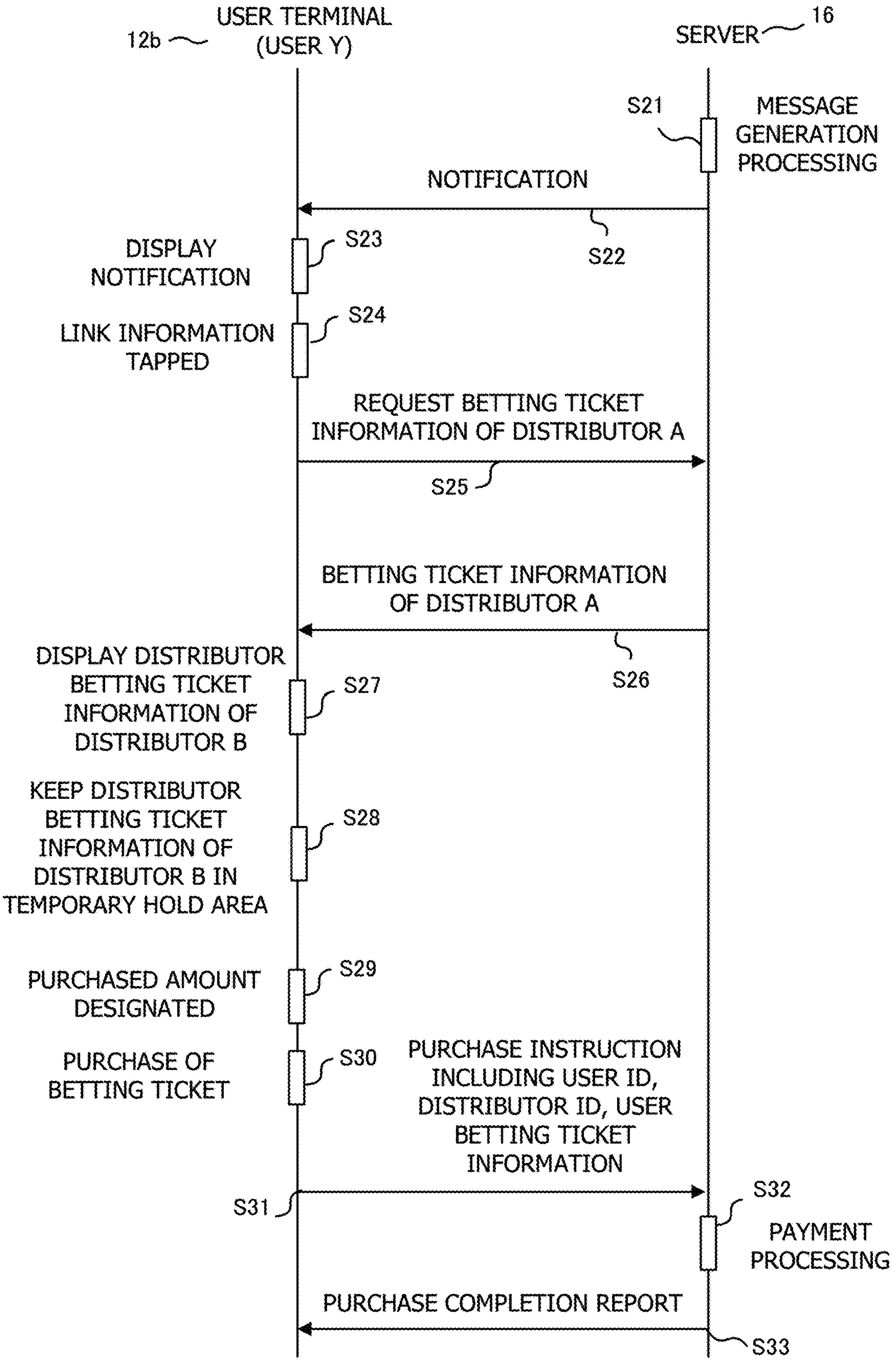
FIG. 13 is a diagram illustrating a sequence between the user terminal 12*b* and the server 16 up to a user Y purchasing a betting ticket in response to a notification of information that the user X purchased a betting ticket by referring to the betting ticket designated by a distributor A according to the present embodiment.

FIG. 13 is a diagram illustrating a sequence between the user terminal 12*b* and the server 16 up to the user Y purchasing a betting ticket in response to a notification of information that the user X purchased a betting ticket by referring to the betting ticket designated by the distributor A according to the present embodiment.

After S15 in FIG. 12, the server 16 (the notification controller unit 48) extracts user ID(s) of user(s) who belong to the same group as the group of the user X from the group information DB 53 by using the user ID of the user X. When user ID(s) of user(s) who belong to the same group as the group of the user X are extracted, the server 16 (the notification controller unit 48) performs message generation processing (S21). Here, assume that the user ID of the user Y is extracted as a member of the group that is the same as the group of the user X. The server 16 (the notification controller unit 48) transmits, to the user terminal 12*b* of the user Y extracted in S21, a notification informing that the user X purchased a betting ticket by referring to the betting ticket designated by the distributor A (S22).

The user terminal 12*b* (the notification reception unit 26) receives the notification from the server 16. Based on the notification, the user terminal 12*b* (the display controller unit 23) displays on the screen 14 a message informing that the user X purchased a betting ticket by referring to the betting ticket designated by the distributor A, as described in FIG. 9 to FIG. 11 (S23).

The user Y taps link information included in the notification (e.g., the message 121 illustrated in FIG. 9, the "piggyback" button 133 illustrated in FIG. 10, or the "piggyback" button 143 illustrated in FIG. 11) (S24). The user terminal 12*b* (the prediction adoption unit 24) requests the server 16 to provide the distributor betting ticket information of the distributor A based on the link information (S25).

The server 16 acquires the distributor betting ticket information of the distributor A from the distributor betting ticket information DB 51 in response to the request and transmits the information to the user terminal 12*b* (S26).

The user terminal 12*b* receives the distributor betting ticket information of the distributor A from the server 16. Then user terminal 12*b* displays details of the prediction of the distributor A on the adopted distributor prediction particulars screen 81 illustrated in FIG. 7 based on the link information and the distributor betting ticket information of the distributor A (S27). At that time, the user terminal 12*b* (the prediction adoption unit 24) holds the distributor betting ticket information of the distributor A in the temporary hold area 29 (S28). When the user Y taps the "add to your cart" button 95 illustrated in FIG. 7, the betting ticket purchase screen 101 illustrated in FIG. 8 is displayed.

In the betting ticket purchase screen 101, the user Y may delete a part of the distributor betting ticket information or may add betting ticket information that the user Y has predicted to the distributor betting ticket information. The user Y, in addition, designates the betting money (or betting points) on each piece of the betting ticket information (S29). In response to these operations, the user terminal 12*b* (the prediction adoption unit 24) updates the information held in the temporary hold area 29. In other words, the user terminal 12*b* (the prediction adoption unit 24) updates details of the temporary hold area 29 (keeps a portion or the entirety of the betting ticket information in temporary hold area 29) in response to the input operations in the betting ticket purchase screen 101.

When a betting ticket to be purchased is finalized in the betting ticket purchase screen 101, the user Y taps the purchase execution button 116 (S30). The user terminal 12*b* (the purchase request unit 25) transmits a purchase request that includes user betting ticket information (including the user ID, the race ID, the combination of numbers in the betting ticket, the purchase amount (or purchase Pt), and the distributor ID) to the server 16 based on the details of the temporary hold area 29 (S31).

The server 16 (the user betting ticket information acquisition unit 46) acquires the purchase request. The server 16 (the user betting ticket information acquisition unit 46) registers the details of the user betting ticket information included in the acquired purchase request to the user betting ticket information DB 52. The server 16 (the payment processor unit 47) performs payment processing of the purchase of the betting ticket based on the purchase request (S32). When the payment processing has completed, the server 16 updates the details of the user betting ticket information DB 52 based on the payment details and notifies the user terminal 12*a* of completion of the payment processing (S33).

Figure 14:
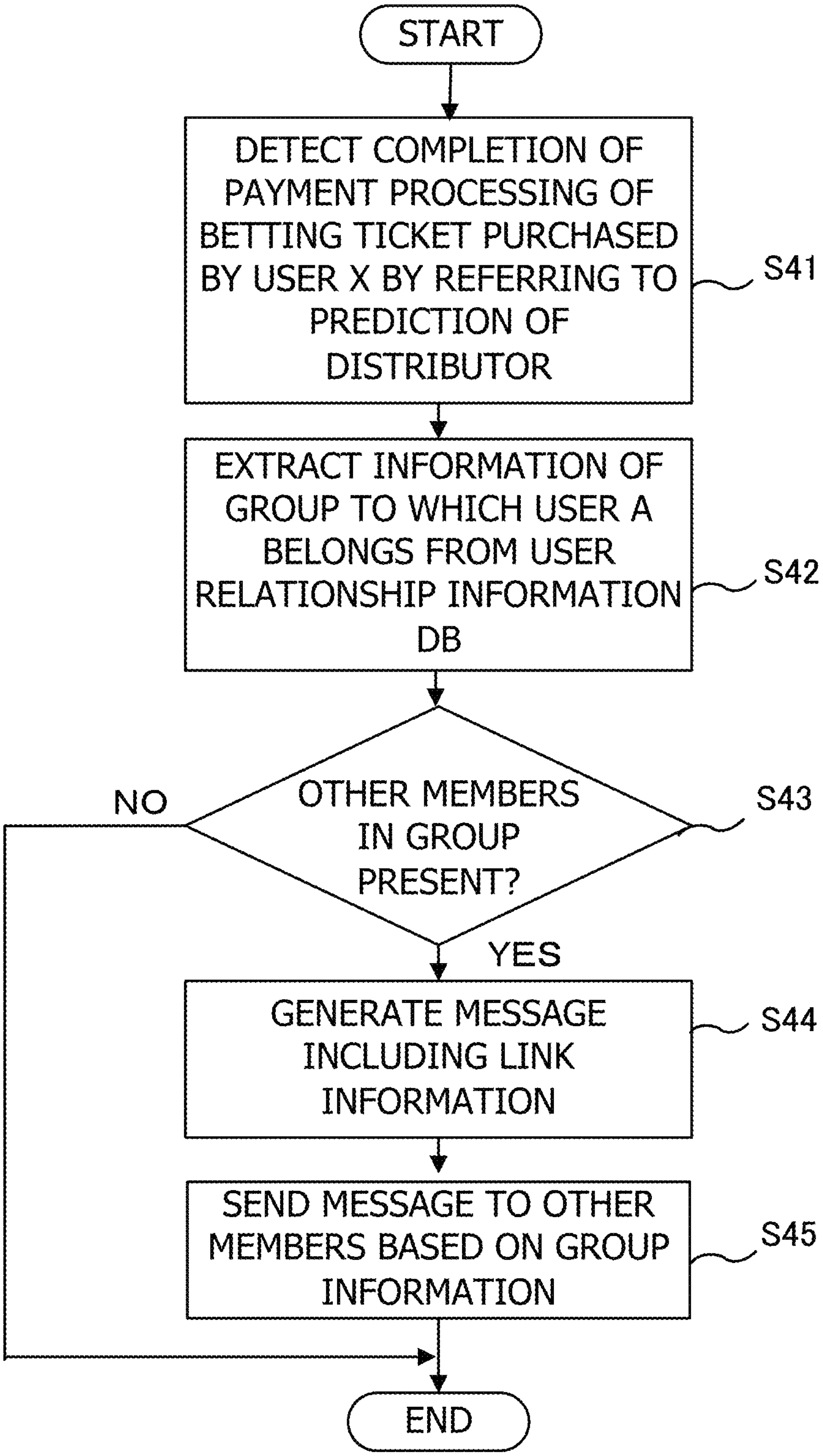
FIG. 14 is a flowchart of message generation processing (S21) and notification processing (S22) in a notification controller unit 48 according to the present embodiment.

FIG. 14 is a flowchart of the message generation processing (S21) and the notification processing (S22) in the notification controller unit 48 according to the present embodiment. The notification controller unit 48 detects completion of the payment processing of the betting ticket that the user X has purchased by referring to the prediction of the distributor A (S41).

The notification controller unit 48 then extracts user ID(s) of user(s) who belong to the same group as the group of the user X from the group information DB 53 by using the user ID of the user X (S42). When no user IDs of users who belong to the same group as the group of the user X are extracted, or in other words, when there are no other members in the group (NO in S43), this flow ends.

When user ID(s) of user(s) who belong to the same group as the group of the user X are extracted, or in other words, when other members are present in the group (YES in S43), the notification controller unit 48 generates a message including link information (S44). For example, assume that a user ID of the user Y is extracted as a member who belongs to the same group as the group of the user X. In this case, the notification controller unit 48 generates a message informing that the user X has purchased a betting ticket by referring to the betting ticket designated by the distributor A. To the message, the notification controller unit 48 gives the link information that causes screen transition to the adopted distributor prediction particulars screen 81 of the distributor A. As described above, link information includes information to specify a transition destination screen (e.g., a screen ID) and information to specify distributor betting ticket information of a distributor displayed in the transition destination screen (e.g., a distributor ID).

The notification controller unit 48 transmits the message with the link information to the user terminal 12 of the user extracted in S42 (S45). Note that when the extracted user has already purchased a betting ticket by referring to the betting ticket designated by the distributor A or other distributors, the notification controller unit 48 does not need to transmit the notification to the user.

Next, under a condition that a user had viewed a video distributed by a distributor but has not seen the distributed video again since then, an example of notifying the user of the betting ticket information of the prediction on the order of arrival made by the distributor and encouraging the user to place a bet related to the notified betting ticket information is explained as an additional embodiment.

For example, the user X viewed a video content of the prediction of the distributor A on a race and put the browsing screen into a negative state before the prediction of the distributor A was finished. In this case, when the prediction of the distributor A is completed, the user X will be notified of betting ticket information of the prediction on the order of arrival made by the distributor. Here, putting the browsing screen into a negative state includes a case, for example, of ending the dedicated application, a case of moving to another screen, or a case of activating another application program. In this manner, the user X can purchase a betting ticket based on the notification informing that the prediction of the distributor A is completed.

Because the configuration of the betting ticket purchase system 11 in the additional embodiment is the same as the configuration illustrated in FIG. 3 except that the storage unit 50 stores the screen status management DB 54 (FIG. 15), the explanation of the same configuration is omitted.

FIG. 15 is a diagram illustrating an example of the configuration of the screen status management DB 54 in the additional embodiment. The screen status management DB 54 includes data items of "user ID", "distributor ID", "video content ID", and "before prediction screen negative flag". The item "user ID" stores information to specify a user (user ID). The item "distributor ID" stores information to specify a distributor (distributor ID). The item "video content ID" stores information to specify a video content of the corresponding distributor (video content ID). The item "before prediction screen negative flag" stores a flag to determine whether or not a user who had been viewing a video of a distributor put the viewing screen of the video into a negative state before the prediction of the distributor was finished.

Figure 16A:
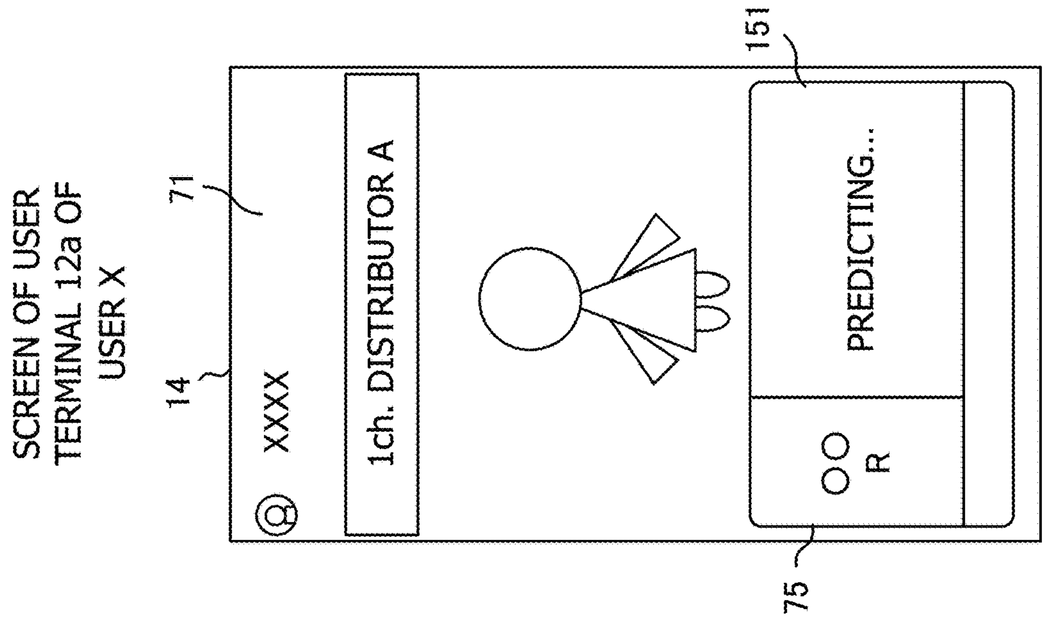
FIGS. 16A to 16C are diagrams illustrating examples of a screen display, respectively, in the additional embodiment.
Figure 16B:
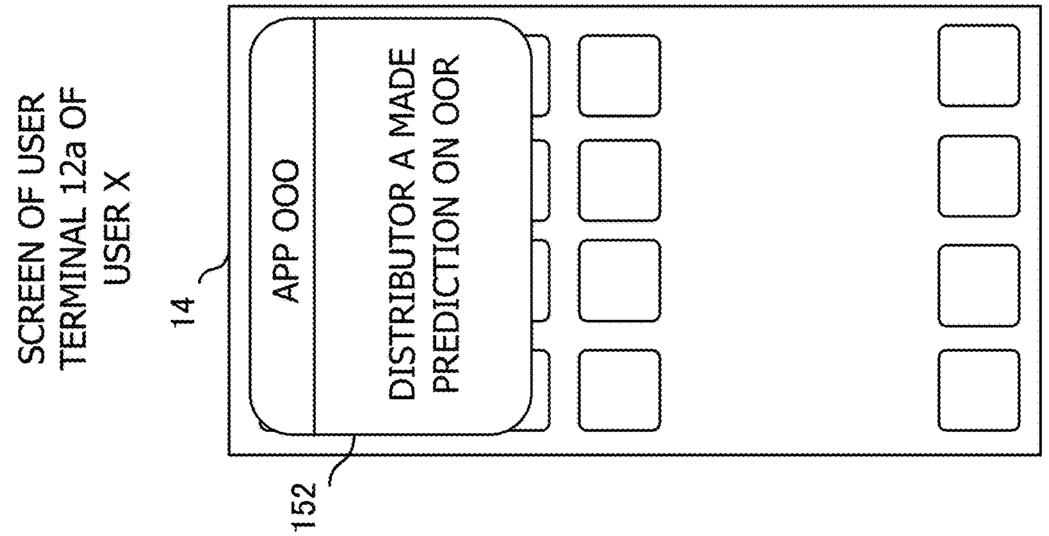
Figure 16C:
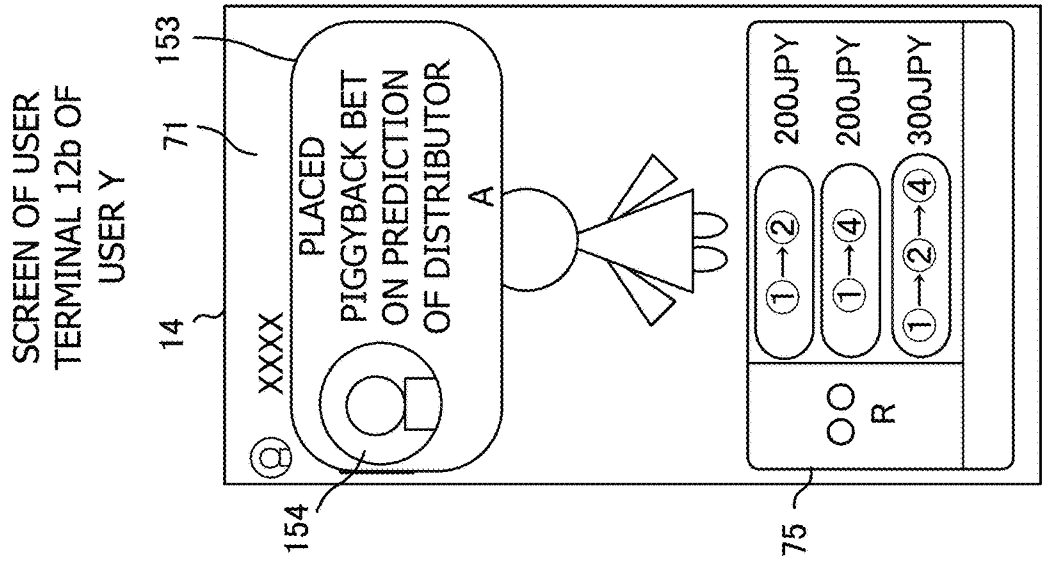

FIGS. 16A to 16C is diagrams illustrating examples of a screen display, respectively, in the additional embodiment. FIG. 16A illustrates the distributor prediction screen 71 on the user X side (the user terminal 12*a*) before a distributor finalizes the prediction on a race. In this case, because the distributor A has not yet designated betting ticket information, a text "predicting" is displayed in the distributor betting ticket information display field 75. At that time, the prediction adopting button 76 is unusable.

FIG. 16B is an example of a notification when a prediction of a distributor is designated under a condition that a user had once browsed (viewed) the distributor prediction screen 71 before the distributor finalized the prediction on a race on the user X side (the user terminal 12*a*) and put the dedicated application program into a negative state. In this example, when the prediction of the distributor is designated under such a condition, in the user terminal 12*a*, a push notification is given and a message 152 is displayed on the screen 14 based on the notification information from the server 16.

The message 152 displays information that a betting ticket that the distributor A predicted was designated. In addition, the message 152 provides a link (link information) to the adopted distributor prediction particulars screen 81 (FIG. 7) of the betting ticket designated by the distributor A.

Here, "link information" includes information to specify a transition destination screen (e.g., a screen ID) and information to specify distributor betting ticket information of the distributor displayed in the transition destination screen (e.g., a distributor ID).

Accordingly, when the user X taps this message 152, the dedicated application program becomes an active state and, based on the link information, the distributor prediction screen 71 (FIG. 6) or the adopted distributor prediction particulars screen 81 (FIG. 7) about the betting ticket designated by the distributor A is displayed. Afterwards, by performing the operations explained in FIG. 7 and FIG. 8, the user X can purchase a betting ticket by referring to the prediction of the distributor A.

Note that the format of the message 152 is merely an example and is not limited to this format as long as the message clarifies that the betting ticket information that the distributor A predicted is registered. The format of the notification may be vibrations or sounds that let the user X know.

FIG. 16C illustrates an example of a toast notification to the user Y side (the user terminal 12*b*) when the user X purchased a betting ticket by referring to the prediction of the distributor A, and the user terminal 12*b* of the user Y who is viewing a video content of the distributor A is notified of information that the user X purchased a betting ticket by referring to the prediction of the distributor A. In this example, a toast notification 153 displays an icon 154 of the user X and information that the user X purchased a betting ticket by referring to the prediction of the distributor A. For example, assume that the user Y is considering a purchase of the betting ticket that the distributor A predicted while displaying the distributor prediction screen 71 on the user terminal 12*b*. In this case, the display of the notification 153 informing that the user X purchased a betting ticket by referring to the prediction of the distributor A can encourage the user Y to purchase the betting ticket.

Note that the format of the message 153 is merely an example and is not limited to this format as long as the message clarifies that the user X purchased a betting ticket by referring to the prediction of the distributor A. The format of the notification may be vibrations or sounds that let the user X know.

Figure 17:
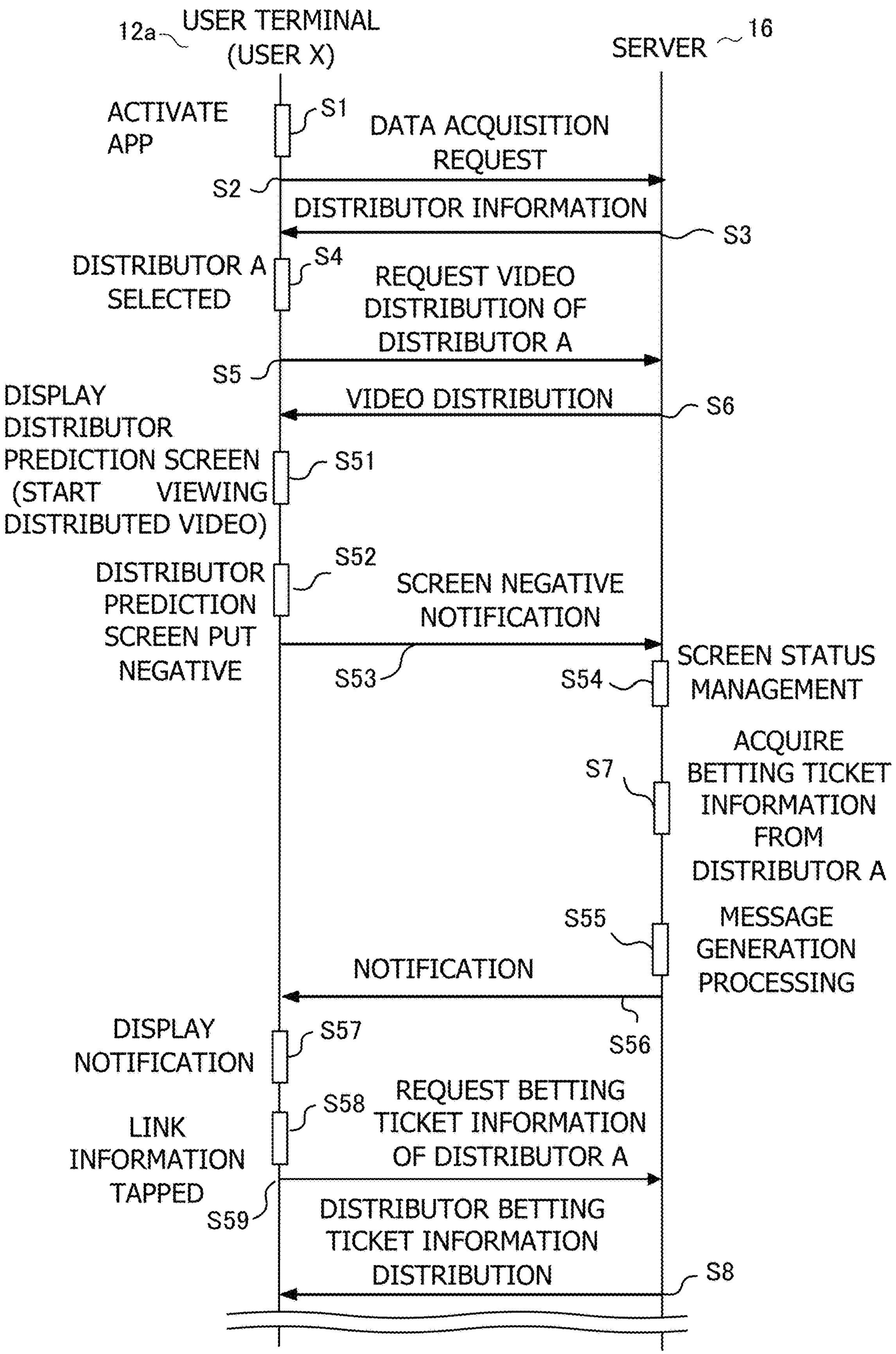
FIG. 17 is a diagram illustrating a sequence between the user terminal 12*a* and the sever 16 in the additional embodiment.

FIG. 17 is a diagram illustrating a sequence between the user terminal 12*a* and the sever 16 in the additional embodiment. FIG. 17 is mostly the same as FIG. 12, but processing of S51 to S54 and processing of S55 to S59 are added.

The user X operates the user terminal 12*a* and activates the dedicated application program installed in the user terminal 12*a* (S1). The user terminal 12*a* having the dedicated application program activated makes a data acquisition request to the server 16 (S2). In response to the request, the server 16 transmits distributor information (including a distributor ID, a race ID, and a video content ID) to the user terminal 12 (S3).

When receiving the distributor information from the server 16, the user terminal 12*a* displays the distributor information in the distributor list 66 illustrated in FIG. 5. The user X selects the thumbnail image 66*a* of the distributor information of the distributor A, for example, from the distributor list 66 (S4). The user terminal 12*a* requests a video content of the distributor A based on the video content ID (S5). The user terminal 12*a* receives the video content from the server 16 in response to the request (S6). The user terminal 12*a* plays the received video content in the distributor prediction screen 71 illustrated in FIG. 6 (S51). Assume that the prediction of the distributor on a betting ticket has not been designated at this point in time.

Before the prediction of the distributor A on a betting ticket is designated, the user X operates the user terminal 12*a* and puts the distributor prediction screen 71 into a negative state (S52). Here, putting the distributor prediction screen 71 into a negative state includes a case, for example, of ending the dedicated application, a case of moving to a screen other than the distributor prediction screen 71, or a case of activating another application. The user terminal 12*a*, then, notifies the server 16 of information that the distributor prediction screen 71 is in a negative state (a screen negative notification) (S53). The screen negative notification includes a user ID, a distributor ID, and a video content ID.

When acquiring the information that the distributor prediction screen 71 is in a negative state, the server 16 manages the user X having put the distributor prediction screen 71 into a negative state before the distributor A's betting prediction is designated.

Afterwards, when a combination of numbers of the order of arrival on a betting ticket and a purchased amount are designated by the distributor A, the server 16 (the distributor betting ticket information acquisition unit 44) acquires the designated details (the distributor betting ticket information) (S7). The distributor betting ticket information includes a distributor ID, a race ID, a combination of numbers on a betting ticket, a purchased amount, and a video content ID. The server 16 (the distributor betting ticket information acquisition unit 44) registers the acquired distributor betting ticket information in the distributor betting ticket information DB 51.

When the distributor betting ticket information of the distributor A is registered in the distributor betting ticket information DB 51, the server 16 (the notification controller unit 48) generates a message informing that the distributor A's prediction on the race in a betting ticket is designated (S55). The server 16 (the notification controller unit 48) transmits the generated message to the user terminal 12*a* (S56).

The user terminal 12*a* (the notification reception unit 26) receives the notification from the server 16. As described with reference to FIG. 16B, based on the notification, the user terminal 12*a* (the display controller unit 23) displays on the screen 14 the message informing that the distributor A's prediction on the race in a betting ticket is designated (S57).

The user X taps link information (e.g., the message 152 illustrated in FIG. 16B) included in the notification (S58). The user terminal 12*a* (the prediction adoption unit 24) makes a request for the distributor betting ticket information of the distributor A to the server 16 based on the link information (S59).

In response to the request, the server 16 (the distributor betting ticket information provider unit 45) distributes the distributor betting ticket information to the user terminal 12*a* (S8). The subsequent steps are the same as the sequence in FIG. 12 and the explanation is omitted.

Figure 18:
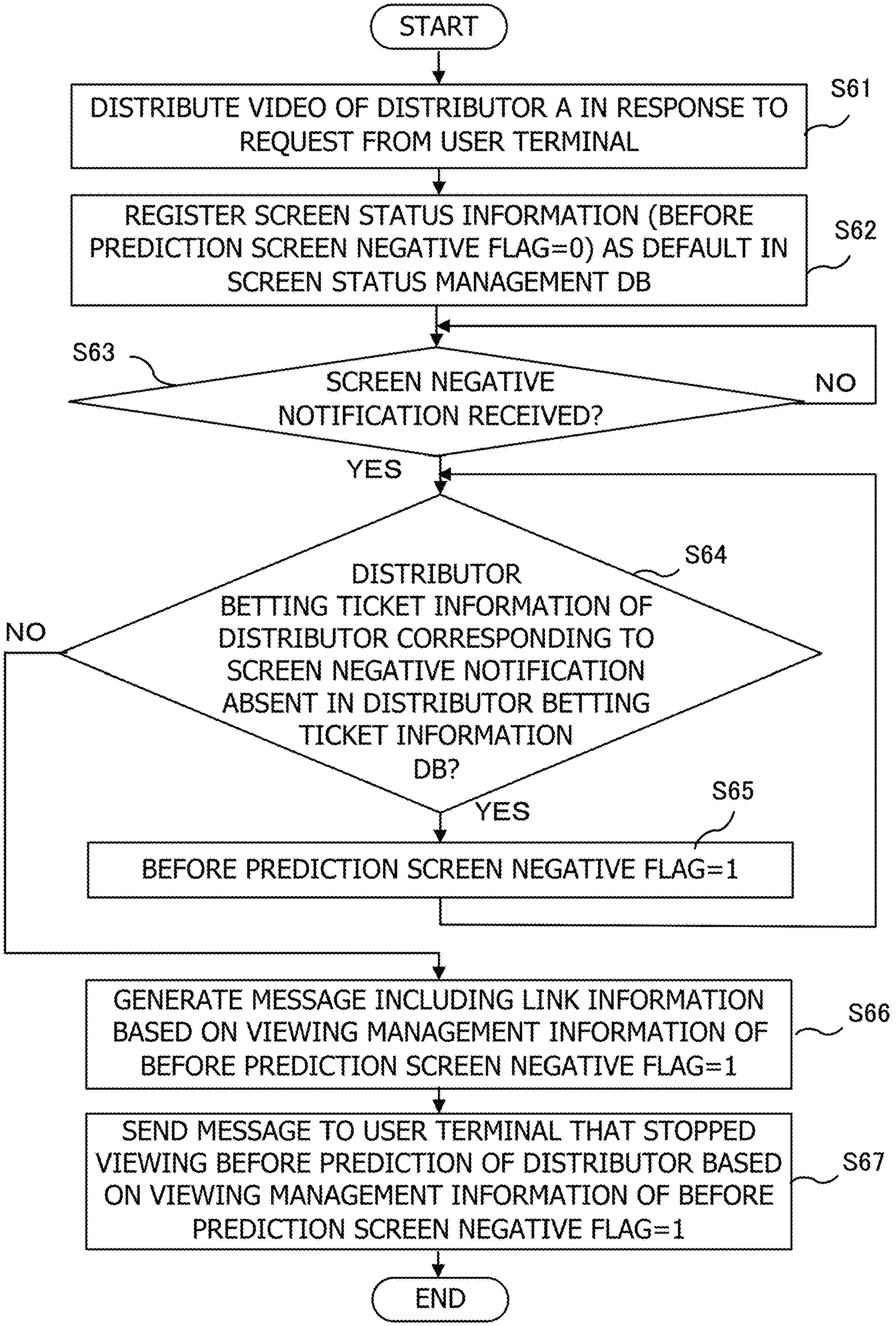
FIG. 18 is a flowchart of message notification processing performed by a server according to the additional embodiment.

FIG. 18 is a flowchart of message notification processing performed by a server according to the additional embodiment. The distribution controller unit 43 distributes a video of the distributor A in response to the request from the user terminal 12*a* (S61). Assume that the distributor A's betting prediction has not been designated at this point in time.

At that time, the distribution controller unit 43 registers screen status management information (a user ID, a distributor ID, a video content ID, a before prediction screen negative flag=0) as default in the screen status management DB 54 upon the start of distribution of the video content of the distributor A to the user X (S62).

The server 16 stays in a waiting state while the user X is viewing the video content of the distributor A ("NO" in S63). When the screen that the user X is viewing the video content of the distributor A is put into a negative state, or in other words, when a screen negative notification is received from the user terminal 12*a* ("YES" in S63), the server 16 (the notification controller unit 48) determines whether the distributor betting ticket information of the distributor corresponding to the screen negative notification is absent in the distributor betting ticket information DB 51 or not (S64).

When the distributor betting ticket information of the distributor corresponding to the screen negative notification being absent in the distributor betting ticket information DB 51 is determined ("YES" in S64), the server (the notification controller unit 48) sets the before prediction screen negative flag of the corresponding screen status management information to "1" in the screen status management DB 54 based on the screen negative notification (including a user ID, a distributor ID, and a video content ID) (S65).

Assume that the distributor betting ticket information of the distributor corresponding to the screen negative notification is registered. When the distributor betting ticket information of the distributor corresponding to the screen negative notification being present in the distributor betting ticket information DB 51 is determined ("NO" in S64), the server 16 (the notification controller unit 48) generates a message including link information based on the screen status management information of the before prediction screen negative flag=1 (S66). In other words, the notification controller unit 48 generates a message informing that the predicted betting ticket information related to a video content of the distributor that has been viewed before the prediction was finished is designated. To the message, the notification controller unit 48 gives link information that causes screen transition to the distributor prediction screen 71 or the adopted distributor prediction particulars screen 81 of the distributor A. As described above, the link information includes information to specify a transition destination screen (e.g., a screen ID) and information to specify distributor betting ticket information of the distributor displayed in the transition destination screen (e.g., a distributor ID).

The notification controller unit 48 transmits the message with the link information to the user terminal 12*a* that makes the screen stay in a negative state based on the screen negative notification (S67).

The user X who received the message operates the user terminal 12*a* and taps the link information given to the message. Then the distributor prediction screen 71 or the adopted distributor prediction particulars screen 81 of the distributor A is displayed. In the following steps, the user X can purchase a betting ticket by referring to the prediction of the distributor A in the same manner as the details explained with reference to FIG. 6 to FIG. 8.

Note that in the above example, a message including link information was sent to the user terminal 12*a* of the user X, but a message without the link information may be sent. In this case, the user X may display the distributor prediction screen 71 or the adopted distributor prediction particulars screen 81 and may perform the betting operation by operating the user terminal 12*a*.

In the above example, under the condition that a user had once viewed a video distributed by a distributor but has not seen the distributed video again since then, the notification controller unit 48 notifies the user of betting ticket information of the prediction on the order of arrival made by the distributor. However, the embodiment is not limited to this example. For example, the notification controller unit 48 may notify the user terminal 12*a* of the user X of the above message (may include the link information) at a timing before the betting deadline of the race of the video content related to the prediction of the race (e.g., 15 minutes before the betting deadline).

Afterwards, the messages illustrated in FIG. 9 to FIG. 11 are displayed on the user terminal 12*b* of the user Y, who has a prescribed relationship with the user X. The user Y operates the user terminal 12*b* and taps the link information in the message. Based on the link information, the adopted distributor prediction particulars screen 81 (FIG. 7) for the betting ticket designated by the distributor A is displayed. In the following steps, the user Y can purchase a betting ticket by referring to the prediction of the distributor A, as the user X did, by performing the operations explained in FIG. 7 and FIG. 8.

As described with reference to FIG. 16C, when the user Y, who has a prescribed relationship with the user X, is considering a purchase of a betting ticket after viewing a video content of the distributor A, the user terminal 12*b* of the user Y can be notified of information that the user X purchased a betting ticket based on the prediction of the distributor A. In this case, when the user X's payment of the betting ticket purchase has been completed, by using a distributor ID and a race ID included in the user betting ticket information, the server 16 identifies a video content ID from the distributor betting ticket information. Based on the distributor ID and the video content ID, the server 16 can identify, from the screen status management DB 54, user(s) who is/are viewing the video content corresponding to the information of the betting ticket that the user X purchased. Here, the user Y is a user who has a prescribed relationship with the user X as described above. The processing, in this manner, can encourage the user Y, who has a prescribed relationship with the user X, to purchase a betting ticket that the user Y is considering.

Note that the user terminal 12*b* of the user Y may be notified of information that the user X has made a bet based on the prediction of the distributor A not only when the user Y is viewing the video content of the distributor A, but also under the condition that the user Y had once viewed the video content but has not viewed the distributed video content again since then (case 1). Or when the user Y has viewed another video content of the distributor A, who distributed the video content (case 2), the user terminal 12*b* of the user Y may be notified of the information that the user X has made a bet based on the prediction of the distributor A. Alternatively, in either case 1 or case 2 and in a case in which the user Y has not yet placed a bet, the user terminal 12*b* of the user Y may be notified of the information that the user X has made a bet based on the prediction of the distributor A. Here, the case in which the user Y has not yet placed a bet may be a case in which the user Y has not placed any bet at all for the race or may be a case in which the user Y has not placed a bet based on the prediction of the distributor A.

Figure 19:
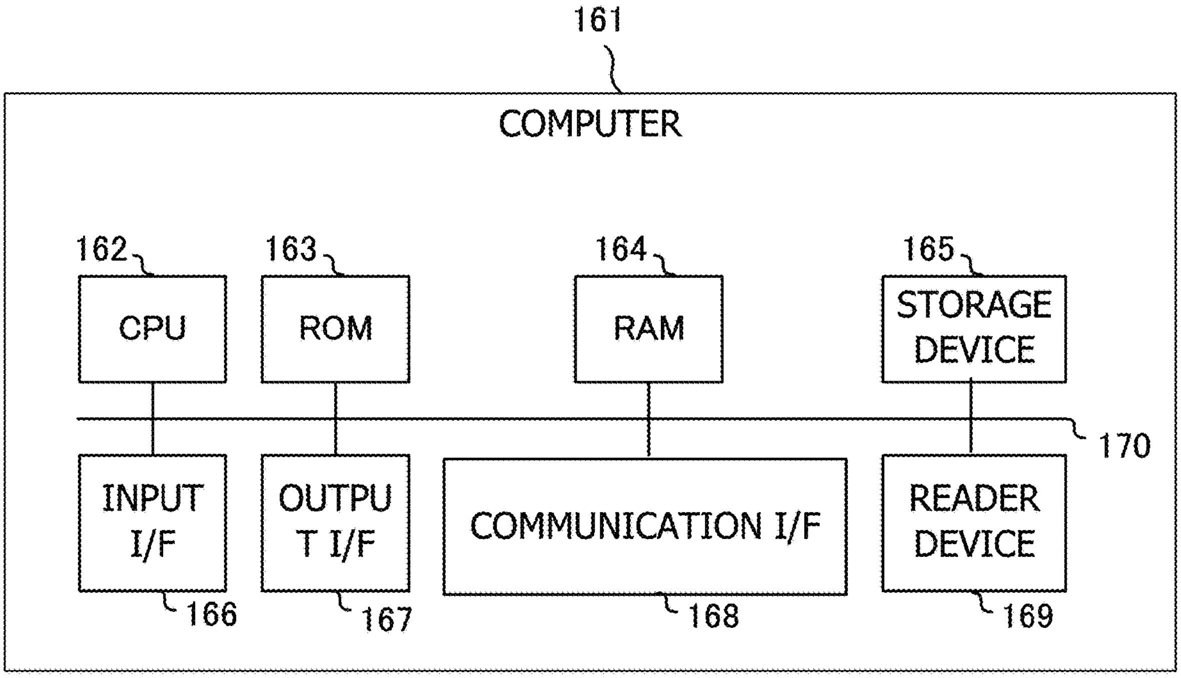
FIG. 19 is an example of a configuration block diagram of a hardware environment of a computer executing a program according to the present embodiment and the additional embodiment.

FIG. 19 is an example of a configuration block diagram of a hardware environment of a computer executing a program according to the present embodiment and the additional embodiment. A computer 161 may be the user terminal 12, may be the distributor terminal 15, or may be the server 16. The computer 161 is configured of CPU 162, ROM 163, RAM 164, a storage device 165, an input I/F 166, an output I/F 167, a communication I/F 168, a reader device 169, and a bus 170.

Here, CPU stands for a central processing unit. ROM stands for a read only memory. RAM stands for a random access memory. I/F stands for an interface. CPU 162, ROM 163, RAM 164, the storage device 165, the input I/F 166, the output I/F 167, the communication I/F 168 and the reader device 169, when necessary, are connected to the bus 170.

When the computer 161 is the server 16, CPU 162 reads out a program according to the present embodiment from the storage device 165 and functions as the distribution controller unit 43, the distributor betting ticket information acquisition unit 44, the distributor betting ticket information provider unit 45, the user betting ticket information acquisition unit 46, the payment processing unit 47, and the notification controller unit 48. ROM 163 stands for a read only memory. RAM 164 is a memory for a temporary storage.

The storage device 165 is a device for storing a high capacity of information. Various forms of storage devices can be used for the storage device 165 such as hard disk drives, solid state drives (SSD), and flash memories. The storage device 165 stores programs according to the embodiments of the present invention and various types of data stored in the storage unit 50.

The input I/F 166 can connect to input devices such as a keyboard, a mouse, an electronic camera, a web camera, a microphone, a scanner, a sensor, a tablet, a touch-screen display, and an information reader device. The output I/F 167 can connect to output devices such as a display, a touch-screen, a projector, a printer, and a speaker.

The communication I/F 168 is an interface such as a port for connecting to a communication network to communicate with other devices. The communication network may be a network such as the Internet, a local area network (LAN), a wide area network (WAN), a dedicated line network, a wire communication network, and a wireless communication network. The reader device 169 is a device for reading out a portable recording medium.

The program that realizes the processing described in the above embodiments may be provided from a program provider over the communication network and through the communication I/F 168 and may be stored in the storage device 165, for example. The program that realizes the processing described in the above embodiments may also be stored in a portable recording medium that are commercially available and are distributed in the marketplace. In such a case, the portable recording medium may be set to the reader device 169 and the stored program may be read out and executed by CPU 162. Various forms of recording media such as CD-ROM, a flexible disk, an optical disk, a magnetic optical disk, an IC card, a USB memory device, and a semiconductor memory card can be used as the portable recording medium. Programs stored in such recording media are read out by the reader device 169.

These programs may be installed in a standalone computer, or may be installed in a cloud computer so that only the functions are provided to users. In the present embodiment, an application program that can communicate with the server 16 is installed in the user terminals 12 to control the betting ticket purchase system of the present embodiment, which however does not limit this embodiment. For example, a user may access the server 16 by using a web browser installed in user terminal 12 and may use the system according to the present embodiment that is operated on the server 16 side.

According to the present embodiment, when the user X purchased a betting ticket based on the prediction of the distributor A, the user Y can be notified of information that the user X purchased a betting ticket based on the prediction of the distributor A. The present embodiment can consequently encourage the user Y to purchase a betting ticket that the distributor A predicted based on the notification. At that time, a notification informing that the user X, who has a prescribed relationship with the user Y, purchased a betting ticket based on the prediction of the distributor A is more likely to lead the user Y to the action of purchasing a betting ticket based on the prediction of the distributor A than a notification informing that the third person, who has no relationship with the user Y, purchased a betting ticket based on the prediction of the distributor A. Accordingly, the present embodiment can increase the probability that the user Y purchases a betting ticket based on the prediction of the distributor A.

One mode of the present invention, when the first user purchases a betting ticket based on predictions of a distributor, can make a prescribed notification to the second user and can receive a betting ticket purchase request of the second user that was made in response to the notification.

In the present embodiment, the term “race” or “racing” is used as an example, which however does not limit this embodiment. For example, the term “competition”, “game”, “joust”, “play”, “contest”, etc. may be used in place of “race” or “racing”.

Although the present modes are explained above based on the embodiments and modifications, the embodiments in the above-described modes are for facilitating the understanding of the present modes and do not limit the present modes. The present modes can be changed or modified without departing from the spirit and scope of the claims, and the present modes include their equivalents. Some technical features may be eliminated as appropriate unless the present specification describes the technical features as essential.

In addition to the above-described embodiments, the following appendants are added.

Appendant 1

An information processor apparatus that can communicate with a terminal device used by a user over a communication network, the apparatus comprising:

- an acquisition unit configured to acquire betting information indicating that a first user has made a bet based on provider-designated betting ticket information that indicates betting ticket information designated by a provider that provides betting ticket information related to a betting ticket for betting a prescribed value on a predicted result of racing;
- a notification unit configured to notify, when the betting information is acquired, a terminal device of a second user who has a prescribed relationship with the first user of information related to the provider by using a prescribed relationship information; and
- a reception unit configured to receive a betting ticket based on the provider-designated betting ticket information from the second user based on the notified information related to the provider.

This configuration allows for making a prescribed notification to the second user when the first user purchased a betting ticket based on the prediction of the distributor and for receiving a request, made on the basis of the notification, for purchasing a betting ticket from the second user.

Appendant 2

The information processor apparatus according to Appendant 1, wherein

- as the information related to the provider, the notification unit notifies of at least one of information that the first user has made a bet based on the provider-designated betting ticket information and provider-related information that is information related to the provider.

This configuration allows for notifying the second user of, for example, the first user having purchased a betting ticket based on the prediction of the distributor and details of the prediction of the distributor.

Appendant 3

The information processor apparatus according to Appendant 1, wherein

- when a content related to the provider-designated betting ticket information is not displayed in the terminal device of the second user, the notification unit notifies the terminal device of the second user of information related to the content related to the provider-designated betting ticket information as the information related to the provider.

This configuration allows for notification to the terminal device of the second user even when the content related to the provider-designated betting ticket information is not in an active state (e.g., in an inactivated state) in the terminal device of the second user, for example. The terminal device of the second user that received the notification displays the details of the notification.

Appendant 4

The information processor apparatus according to any one of Appendants 1 to 3, wherein

- the prescribed relation information is group information related to a group of users formed in advance, and the notification unit notifies the terminal device of the second user who is in the same group as the first user of the information related to the provider by using the group information.

This configuration allows for notifying users in the same group of a purchase action of other users. As a result, depending on the relationship between users, the first user's action of purchasing the betting ticket may encourage the second user to purchase a betting ticket and may lead to the second user's purchase of a betting ticket.

Appendant 5

A control program causing a computer that can communicate with a terminal device used by a user over a communication network to execute processing comprising:

- acquiring betting information indicating that a first user has made a bet based on provider-designated betting ticket information that indicates betting ticket information designated by a provider that provides betting ticket information related to a betting ticket for betting a prescribed value on a predicted result of racing;
- notifying, when the betting information is acquired, a terminal device of a second user who has a prescribed relationship with the first user of information related to the provider by using a prescribed relationship information; and
- receiving a betting ticket based on the provider-designated betting ticket information from the second user based on the notified information related to the provider.

This configuration allows for making a prescribed notification to the second user when the first user purchased a betting ticket based on the prediction of the distributor and for receiving a request, made on the basis of the notification, for purchasing a betting ticket from the second user.

Appendant 6

A control method causing a computer that can communicate with a terminal device used by a user over a communication network to execute processing comprising:

- acquiring betting information indicating that a first user has made a bet based on provider-designated betting ticket information that indicates betting ticket information designated by a provider that provides betting ticket information related to a betting ticket for betting a prescribed value on a predicted result of racing;

notifying, when the betting information is acquired, a terminal device of a second user who has a prescribed relationship with the first user of information related to the provider by using a prescribed relationship information; and receiving a betting ticket based on the provider-designated betting ticket information from the second user based on the notified information related to the provider.

This configuration allows for making a prescribed notification to the second user when the first user purchased a betting ticket based on the prediction of the distributor and for receiving a request, made on the basis of the notification, for purchasing a betting ticket from the second user.

Appendant 7

An information processor apparatus that can communicate with a terminal device used by a user over a communication network, the apparatus comprising:

a specification unit configured to specify a video content selected by a first user from one or more video contents distributed by a provider;

a notification unit configured to notify a terminal device of the first user of betting ticket information of racing associated with the specified video content at a prescribed timing associated with the video content; and a reception unit configured to receive a betting ticket based on the betting ticket information notified from the first user.

Even under the condition that a user had once viewed a video distributed by a distributor but has not viewed the distributed video again since then, this configuration notifies the user of a message informing that information on the prediction of the distributor was registered, advising the user to place a bet. This prevents the user's loss of betting opportunity and also prevents a loss of opportunity for adopting the prediction on betting made by the distributor.

Appendant 8

The information processor apparatus according to Appendant 7, wherein when a betting ticket based on the notified betting ticket information is received from the first user, the notification unit notifies a terminal device of a second user who is viewing the specified video content of information that the first user made a bet.

When the second user who has a prescribed relationship with the first user considers the purchase of a betting ticket after viewing a video content of the distributor A, this configuration can notify the terminal device of the second user of information that the first user has purchased a betting ticket based on the predictions of the distributor A. This configuration consequently encourages the second user to purchase a betting ticket that the second user is considering.

Appendant 9

A control program causing an information processor apparatus that can communicate with a terminal device used by a user over a communication network to execute processing comprising:

specifying a video content selected by a first user from one or more video contents distributed by a provider;

notifying a terminal device of the first user of betting ticket information of racing associated with the specified video content at a prescribed timing associated with the video content; and receiving a betting ticket based on the betting ticket information notified from the first user.

Even under the condition that a user had once viewed a video distributed by a distributor but has not viewed the distributed video again since then, this configuration notifies the user of a message informing that information on the prediction of the distributor was registered, advising the user to place a bet. This prevents the user's loss of betting opportunity and also prevents a loss of opportunity for adopting the prediction on betting made by the distributor.

Appendant 10

A control method executed by a computer that can communicate with a terminal device used by a user over a communication network, the method comprising:

specifying by a computer a video content selected by a first user from one or more video contents distributed by a provider;

notifying by a computer a terminal device of the first user of betting ticket information of racing associated with the specified video content at a prescribed timing associated with the video content; and receiving by a computer a betting ticket based on the betting ticket information notified from the first user.

Even under the condition that a user had once viewed a video distributed by a distributor but has not viewed the distributed video again since then, this configuration notifies the user of a message informing that information on the prediction of the distributor was registered, advising the user to place a bet. This prevents the user's loss of betting opportunity and also prevents a loss of opportunity for adopting the prediction on betting made by the distributor.

What is claimed is:

1. An information processor apparatus that can communicate with a terminal device used by a user over a communication network, the apparatus comprising:

a processor;

a communication interface for connecting to the communication network;

a memory for a temporary storage; and a storage device that stores group information related to a group of users;

wherein the processor acquires betting information from a terminal device of a first user through the communication interface, the betting information indicating that the first user has made a bet based on provider-designated betting ticket information that indicates betting ticket information designated by a provider that provides betting ticket information related to a betting ticket for betting a prescribed value on a predicted result of racing;

when the betting information is acquired, the processor stores the betting information in the memory, acquires the group information from the storage device, and displays, on a chat screen of an application program installed on a terminal device of a second user in a group chat of a same group as the first user by using the group information, a message including information indicating that the first user purchased the betting ticket by referring to a prediction of the provider, the provider-designated betting ticket information indicating details of the prediction on an order of arrival made by the provider, and a button to be tapped to piggyback on the prediction of the provider; and the processor causes the terminal device of the second user to display a betting ticket purchase screen for purchasing the betting ticket based on the provider-designated betting ticket information when the button is tapped on the terminal device of the second user.

2. The information processor apparatus according to claim 1, wherein as the information related to the provider, the processor notifies of at least one of information that the first user has made a bet based on the provider-designated betting ticket information and provider-related information that is information related to the provider.

3. The information processor apparatus according to claim 1, wherein when a content related to the provider-designated betting ticket information is not displayed in the terminal device of the second user, the processor notifies the terminal device of the second user of information related to the content related to the provider-designated betting ticket information as the information related to the provider.

4. A non-transitory computer-readable storage medium storing a control program causing a computer, the computer including a processor, a communication interface for connecting to a communication network, a memory for a temporary storage, and a storage device, that can communicate with a terminal device used by a user over the communication network to execute processing comprising:

acquiring betting information from a terminal device of a first user through the communication interface, the betting information indicating that the first user has made a bet based on provider-designated betting ticket information that indicates betting ticket information designated by a provider that provides betting ticket information related to a betting ticket for betting a prescribed value on a predicted result of racing;

when the betting information is acquired, storing the betting information in the memory, acquiring group information from the storage device that stores the group information related to a group of users, and displaying, on a chat screen of an application program installed on a terminal device of a second user in a group chat of a same group as the first user by using the group information, a message including information indicating that the first user purchased the betting ticket by referring to a prediction of the provider, the provider-designated betting ticket information indicating details of the prediction on an order of arrival made by the provider, and a button to be tapped to piggyback on the prediction of the provider; and causing the terminal device of the second user to display a betting ticket purchase screen for purchasing the betting ticket based on the provider-designated betting ticket information when the button is tapped on the terminal device of the second user.

5. A non-transitory computer-readable storage medium storing a control method causing a computer, the computer including a processor, a communication interface for connecting to a communication network, a memory for a temporary storage, and a storage device, that can communicate with a terminal device used by a user over the communication network to execute processing comprising:

acquiring betting information from a terminal device of a first user through the communication interface, the betting information indicating that first user has made a bet based on provider-designated betting ticket information that indicates betting ticket information designated by a provider that provides betting ticket information related to a betting ticket for betting a prescribed value on a predicted result of racing;

when the betting information is acquired, storing the betting information in the memory, acquiring group information from the storage device that stores the group information related to a group of users, and displaying, on a chat screen of an application program installed on a terminal device of a second user in a group chat of a same group as the first user by using the group information, a message including information indicating that the first user purchased the betting ticket by referring to a prediction of the provider, the provider-designated betting ticket information indicating details of the prediction on an order of arrival made by the provider, and a button to be tapped to piggyback on the prediction of the provider; and causing the terminal device of the second user to display a betting ticket purchase screen for purchasing the betting ticket based on the provider-designated betting ticket information when the button is tapped on the terminal device of the second user.

6. An information processor apparatus that can communicate with a terminal device used by a user over a communication network, the apparatus comprising:

a processor;

a communication interface for connecting to the communication network;

a memory for a temporary storage; and a storage device that stores group information related to a group of users;

wherein the processor specifies a video content selected by a first user from one or more video contents distributed by a provider;

the processor notifies, through the communication interface, a terminal device of the first user of betting ticket information of racing associated with the specified video content at a prescribed timing associated with the video content; and the processor receives, through the communication interface, first betting information based on the notified betting ticket information from the first user, when the betting information is received, the processor stores the betting information in the memory, acquires the group information from the storage device, and displays, on a chat screen of an application program installed on a terminal device of a second user in a group chat of a same group as the first user by using the group information, a message including information indicating that the first user purchased the betting ticket by referring to a prediction of the provider, the provider-designated betting ticket information indicating details of the prediction on an order of arrival made by the provider, and a button to be tapped to piggyback on the prediction of the provider; and the processor causes the terminal device of the second user to display a betting ticket purchase screen for purchasing the betting ticket based on the provider-designated betting ticket information when the button is tapped on the terminal device of the second user.

7. The information processor apparatus according to claim 6, wherein when the first betting information based on the notified betting ticket information is received from the first user, the processor notifies the terminal device of the second user who is viewing the specified video content of information that the first user has made a bet.

8. A non-transitory computer-readable storage medium storing a control program causing an information processor apparatus, the information processor apparatus including a processor, a communication interface for connecting to a communication network, a memory for a temporary storage; and a storage device, that can communicate with a terminal device used by a user over a communication network to execute processing comprising:

specifying a video content selected by a first user from one or more video contents distributed by a provider;

notifying, through the communication interface, a terminal device of the first user of betting ticket information of racing associated with the specified video content at a prescribed timing associated with the video content; and receiving, through the communication interface, first betting information based on the notified betting ticket information from the first user, wherein when the betting information is received, the processor stores the betting information in the memory, acquires the group information from the storage device, and displays, on a chat screen of an application program installed on a terminal device of a second user in a group chat of a same group as the first user by using the group information, a message including information indicating that the first user purchased the betting ticket by referring to a prediction of the provider, the provider-designated betting ticket information indicating details of the prediction on an order of arrival made by the provider, and a button to be tapped to piggyback on the prediction of the provider; and the processor causes the terminal device of the second user to display a betting ticket purchase screen for purchasing the betting ticket based on the provider-designated betting ticket information when the button is tapped on the terminal device of the second user.

9. A control method executed by a computer, the computer including a processor, a communication interface for connecting to a communication network, a memory for a temporary storage; and a storage device, that can communicate with a terminal device used by a user over a communication network, the method comprising:

specifying by a computer a video content selected by a first user from one or more video contents distributed by a provider;

notifying, through the communication interface, by a computer a terminal device of the first user of betting ticket information of racing associated with the specified video content at a prescribed timing associated with the video content; and receiving, through the communication interface, by a computer first betting information based on the notified betting ticket information from the first user, wherein when the betting information is received, the computer stores the betting information in the memory, acquires the group information from the storage device, and displays, on a chat screen of an application program installed on a terminal device of a second user in a group chat of a same group as the first user by using the group information, a message including information indicating that the first user purchased the betting ticket by referring to a prediction of the provider, the provider-designated betting ticket information indicating details of the prediction on an order of arrival made by the provider, and a button to be tapped to piggyback on the prediction of the provider; and the computer causes the terminal device of the second user to display a betting ticket purchase screen for purchasing the betting ticket based on the provider-designated betting ticket information when the button is tapped on the terminal device of the second user.

* * * * *